(12) United States Patent
Gretz

(10) Patent No.: US 8,148,635 B1
(45) Date of Patent: Apr. 3, 2012

(54) CAMERA MOUNTING ASSEMBLY INCLUDING MOUNTING BAR AND ADAPTER PLATE FOR MOUNTING A SECURITY CAMERA OR FIXTURE TO AN ELECTRICAL BOX

(75) Inventor: Thomas J. Gretz, Port St. Lucie, FL (US)

(73) Assignee: Arlington Industries, Inc., Scranton, PA (US)

( * ) Notice: Subject to any disclaimer, the term of this patent is extended or adjusted under 35 U.S.C. 154(b) by 350 days.

(21) Appl. No.: 12/592,811

(22) Filed: Dec. 3, 2009

Related U.S. Application Data

(63) Continuation-in-part of application No. 12/462,027, filed on Jul. 28, 2009, and a continuation-in-part of application No. 12/456,156, filed on Jun. 12, 2009, now Pat. No. 8,076,575.

(51) Int. Cl.
*H02G 3/08* (2006.01)

(52) U.S. Cl. .............. 174/50; 174/481; 174/53; 174/58; 220/3.2; 220/3.3; 220/4.02; 248/906

(58) Field of Classification Search .................. 174/480, 174/481, 50, 53, 57, 58, 66, 67, 135; 220/3.2–3.9, 220/4.02, 241, 242; 248/906, 343
See application file for complete search history.

(56) References Cited

U.S. PATENT DOCUMENTS

| | | | | |
|---|---|---|---|---|
| 3,859,454 A | * | 1/1975 | Mann | 174/66 |
| 4,733,330 A | * | 3/1988 | Tanaka et al. | 174/58 |
| 5,032,856 A | | 7/1991 | McMinn | |
| 5,087,796 A | * | 2/1992 | Norman | 174/67 |
| 5,477,010 A | * | 12/1995 | Buckshaw et al. | 174/67 |
| 5,790,910 A | | 8/1998 | Haskin | |
| 6,005,190 A | * | 12/1999 | Stark et al. | 174/66 |
| 6,033,129 A | | 3/2000 | Foye | |
| 6,476,856 B1 | | 11/2002 | Zantos | |
| 6,678,001 B1 | | 1/2004 | Elberbaum | |
| 6,740,813 B1 | * | 5/2004 | Gretz | 174/66 |
| 7,117,591 B1 | * | 10/2006 | Gretz | 174/58 |
| 7,271,350 B2 | * | 9/2007 | Johnson | 174/480 |
| 7,511,218 B2 | * | 3/2009 | Kearney | 174/66 |
| 7,786,379 B1 | * | 8/2010 | Kwong et al. | 174/58 |
| 8,076,575 B1 | * | 12/2011 | Gretz | 174/50 |

* cited by examiner

*Primary Examiner* — Angel R Estrada

(57) ABSTRACT

A camera mounting assembly including a mounting bar and an adapter plate for mounting a security camera or an electrical fixture to an electrical box installed in a wall or ceiling. An elongated base portion on the mounting bar is adapted to mount to the face of a conventional electrical box and extend beyond the walls of the box. A pair of prongs extends from the base portion of the mounting bar and at least one aperture is provided on the end of the bar. The adapter plate includes an opening with an inner periphery and an inclined surface adapted for twist locking engagement with the prongs of the mounting bar. The camera mounting assembly enables the mounting of a wide range of conventional security camera housings or electrical fixtures to a conventional electrical box.

14 Claims, 25 Drawing Sheets

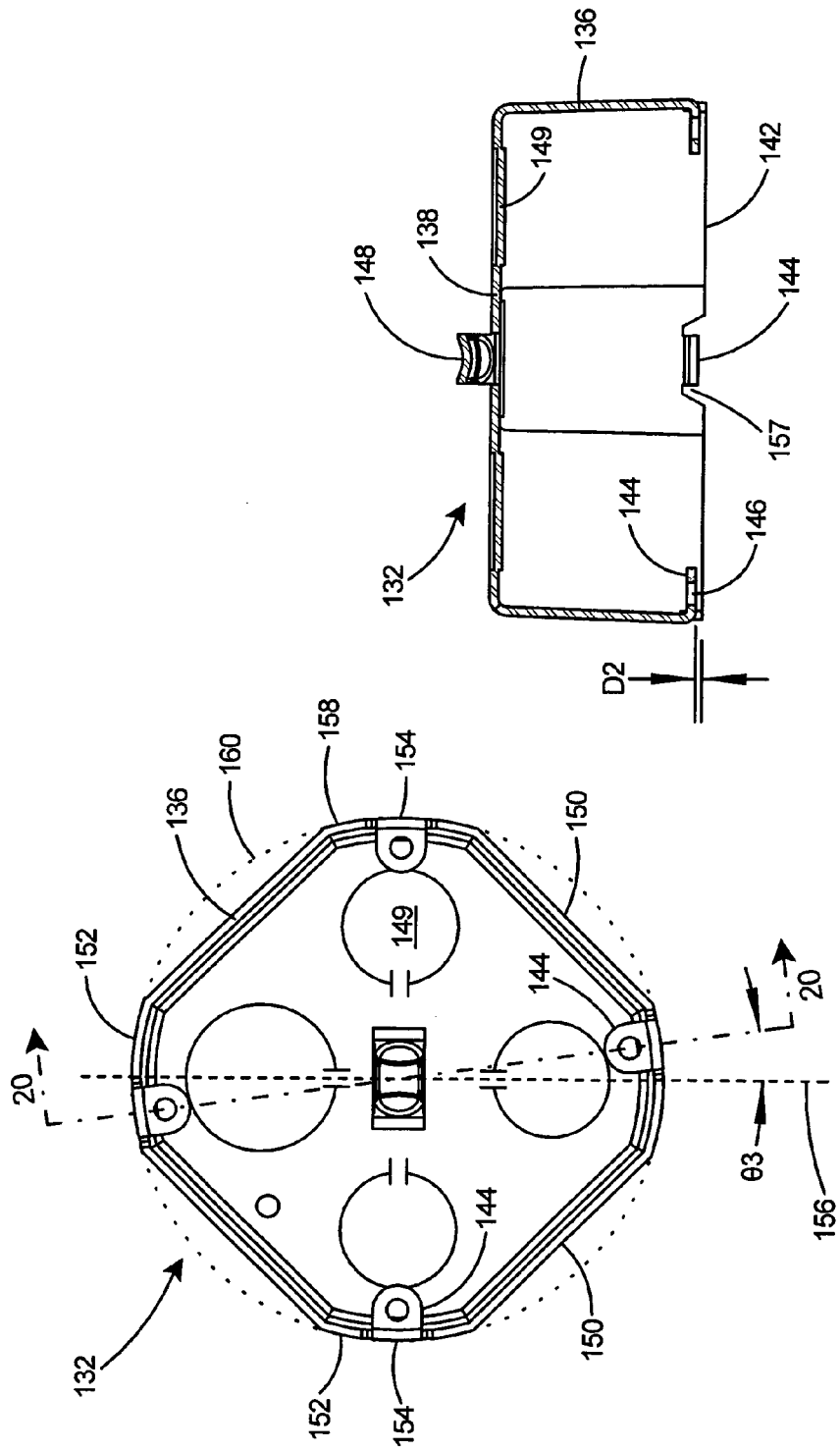

CAMERA MOUNTING ASSEMBLY INCLUDING MOUNTING BAR AND ADAPTER PLATE FOR MOUNTING A SECURITY CAMERA OR FIXTURE TO AN ELECTRICAL BOX

This application is a Continuation-In-Part of U.S. patent application Ser. No. 12/462,027 filed Jul. 28, 2009 and still pending, and is a Continuation-In-Part of U.S. patent application Ser. No. 12/456,156 filed Jun. 12, 2009 now U.S. Pat. No. 8,076,575 and still pending, the entire contents of which are incorporated herein by reference.

FIELD OF THE INVENTION

This invention relates to the installation of electrical components and specifically to a camera mounting assembly for mounting a security camera or an electrical fixtures on a wall, ceiling, or equivalent surface.

BACKGROUND OF THE INVENTION

Security cameras and electrical fixtures are commonly installed on the interiors and exteriors of buildings. Security cameras are frequently installed to provide monitoring of property against intrusion, vandalism, or theft. Electrical fixtures, such as lighting fixtures, are also frequently installed. Electrical fixtures typically run on house current and therefore all electrical connections to the fixtures must be contained within a closed electrical box that is in compliance with all local electrical codes. Although most security cameras are powered by 24 volts, many jurisdictions now require that the electrical connections also be contained within a closed electrical box that meets the electrical code.

As security cameras and light fixtures are typically installed on ceilings or walls, it is desirable to recess the electrical connections within the walls of the building in order to occlude the view of the box that holds the electrical connections as much as possible. Conventional electrical boxes are typically not adaptable to accepting either a security camera or an electrical fixture, therefore requiring the installer to purchase an electrical box that is specifically adapted to either the security camera or to the electrical fixture.

U.S. patent application Ser. No. 12/456,156, which includes common ownership and a common inventor with the present invention, disclosed a one-piece nonmetallic electrical box assembly for mounting and supporting a security camera or electrical fixture and to overcome some of the deficiencies of the aforementioned conventional electrical boxes. The electrical box assembly disclosed therein was universal in nature and could be adapted for use with a wide variety of security cameras or electrical fixtures.

U.S. patent application Ser. No. 12/462,027, which also includes common ownership and a common inventor with the present invention, disclosed an electrical box assembly for those locations in which the local electrical code does not permit nonmetallic electrical boxes. The disclosure included a metallic electrical box and a nonmetallic trim piece for installing an electrical fixture or a security camera on a wall or ceiling.

The present invention provides a camera mounting assembly including an improved mounting bar and adapter plate that enables the mounting of a security camera to any conventional 3½-inch or 4-inch electrical box or 2"×3" device box in addition to the electrical box disclosed in the aforementioned patent applications. By extending the mounting bar outside the walls of an electrical box the mounting bar and adapter plate can be used to mount almost all commercially sold camera housings.

SUMMARY OF THE INVENTION

The invention is a camera mounting assembly that is used in conjunction with an electrical box for mounting a security camera or an electrical fixture on a wall or ceiling. The camera mounting assembly includes a mounting bar and an adapter plate. The mounting bar includes an elongated base portion that adapted to mount to the face of a conventional electrical box and extend beyond the walls of the box. A pair of prongs extends from the base portion of the mounting bar and at least one aperture is provided on the end of the bar. An adapter plate includes an opening with an inner periphery and an inclined surface adapted for twist locking engagement with the prongs of the mounting bar. The camera mounting assembly enables the mounting of a wide range of conventional security camera housings or electrical fixtures to a conventional electrical box. The camera mounting assembly may also be used with an electrical box having an outer flange and a substantially round wall profile and a plurality of rotatable flags. The rotatable flags are adjustable from the front of the electrical box for securing the box to the wallboard in a ceiling or wall. Installation time is greatly reduced for the electrical box as wall preparation requires only a round hole in the wallboard, which can be easily provided by a conventional hole-saw.

OBJECTS AND ADVANTAGES

Several advantages are achieved with the camera mounting assembly of the present invention, including:
(1) The camera mounting assembly enables the rapid mounting of a wide variety of security cameras and electrical fixtures to an electrical box.
2) The camera mounting assembly can be used with a wide variety of conventional electrical boxes including 3½-inch 4-inch, or 2×3" device boxes.
3) An adapter plate includes a peripheral wall and recessed area to provide clearance for the mounting fasteners of a camera housing when mounted thereto.
(4) With the camera housing mounted to the adapter plate, only a simple one-quarter rotation of the camera/plate assembly is required to twist lock it to the mounting bar and electrical box.

These and other objects and advantages of the present invention will be better understood by reading the following description along with reference to the drawings.

DESCRIPTION OF THE DRAWINGS

FIG. 19 is a plan view of the electrical box as taken from the open end.

FIG. 20 is a sectional view of the electrical box taken along line 20-20 of FIG. 19.

FIG. 42 is an exploded perspective view of the preferred embodiment of the camera mounting assembly according to the present invention in alignment with a rapid mount electrical box and a security camera.

INDEX TO REFERENCE NUMERALS IN DRAWINGS

Figure 1:
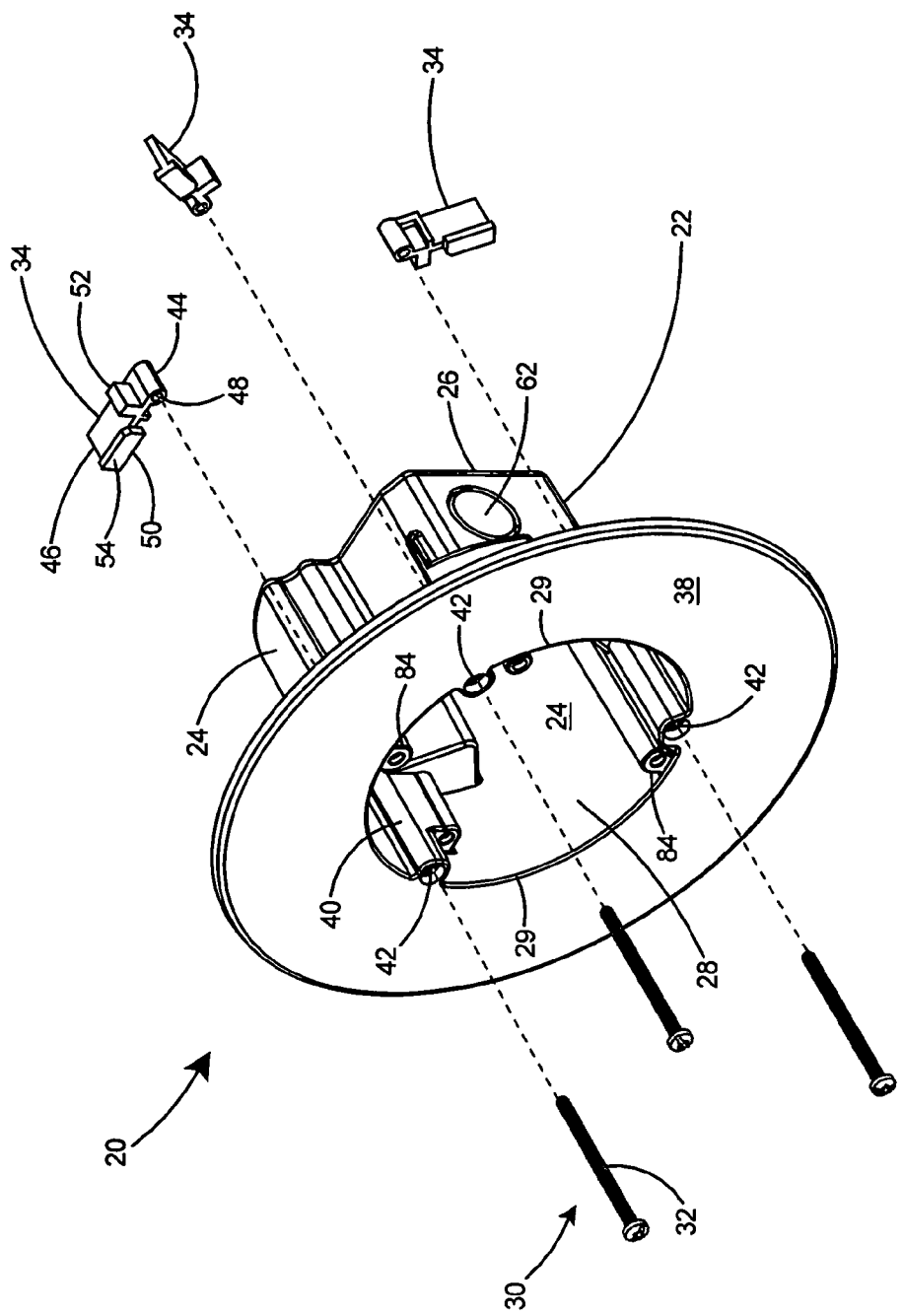
FIG. 1 is a perspective view of a first embodiment of an electrical box assembly according to the present invention.

| | |
|---|---|
| 20 | electrical box assembly, first embodiment |
| 22 | electrical box |
| 24 | sidewall |
| 26 | back wall |
| 28 | electrical enclosure |
| 29 | sidewall end |
| 30 | mounting arrangement |
| 32 | mounting fastener |
| 34 | rotatable flag |
| 38 | flange |
| 40 | mounting boss |
| 42 | oversize bore in mounting boss |
| 44 | proximal end of flag |
| 46 | distal end of flag |
| 48 | bore in flag |
| 50 | foot |
| 52 | tab |
| 54 | flat face |
| 56 | recessed area |
| 58 | extended configuration |
| 60 | tie-off bar |
| 62 | knockout area |
| 64 | aperture in tie-off bar |
| 66 | open channel |
| 68 | rim |
| 70 | second channel |
| 72 | bore |
| 74 | retracted configuration |
| 76 | directional arrow |
| 78 | directional arrow |
| 80 | security camera |
| 81 | mounting bar |
| 82 | bar fastener |
| 83 | fastening arrangement |
| 84 | post |
| 86 | bore in post |
| 88 | opening of electrical box |
| 89 | base of mounting bar |
| 90 | prong on mounting bar |

-continued

INDEX TO REFERENCE NUMERALS IN DRAWINGS

| | |
|---|---|
| 92 | tab on mounting bar |
| 94 | aperture |
| 95 | strut |
| 96 | adapter plate |
| 97 | inside surface of prong |
| 98 | central aperture |
| 100 | flange on adapter plate |
| 102 | wiring aperture |
| 104 | ground strap |
| 106 | central bar |
| 108 | first end |
| 109 | second end |
| 110 | tab on ground strap |
| 111 | aperture |
| 112 | first aperture |
| 114 | second aperture |
| 116 | groove in electrical box |
| 117 | screw |
| 118 | aperture in adapter plate |
| 120 | directional arrow |
| 122 | ceiling |
| 124 | support wire |
| 130 | electrical box assembly, second embodiment |
| 132 | electrical box |
| 134 | trim piece |
| 136 | sidewall of electrical box |
| 138 | back wall |
| 140 | electrical enclosure |
| 142 | rim |
| 144 | tab |
| 146 | bore in tab |
| 148 | tie-off bar |
| 149 | knockout wall portion |
| 150 | wide sidewall portion |
| 152 | narrow sidewall portion |
| 154 | corner |
| 156 | V-shaped cut |
| 157 | axis through center of narrow sidewall portions |
| 158 | outer surface of arcuate sidewall portion |
| 160 | radius of extent of narrow wall portion |
| 162 | flange of trim piece |
| 164 | front surface of flange |
| 166 | rear surface of flange |
| 168 | opening |
| 170 | inner perimeter |
| 172 | channel |
| 174 | shelf |
| 176 | bore in shelf |
| 178 | leg |
| 180 | second boss of trim piece |
| 182 | bore in second boss |
| 184 | mounting boss in trim piece |
| 186 | bore in mounting boss |
| 192 | tab |
| 194 | mounting arrangement for securing assembly to wall |
| 195 | fastening arrangement |
| 196 | fastener |
| 198 | second fastening arrangement |
| 200 | front cover of camera |
| 202 | camera and adapter plate assembly |
| 204 | wall |
| 300 | camera mounting assembly, preferred embodiment |
| 302 | mounting bar |
| 304 | adapter plate |
| 306 | electrical box |
| 308 | end of mounting bar |
| 310 | wall of electrical box |
| 312 | base member |
| 314 | front surface of base member |
| 316 | rear surface of base member |
| 318 | center |
| 322 | prong |
| 324 | narrow central portion |
| 326 | wide end portion |
| 328 | box mounting aperture |
| 328a | first pair of box mounting apertures |
| 328b | second pair of box mounting apertures |
| 328c | third pair of box mounting apertures |
| 329 | connection point of electrical box |
| 330 | second aperture |
| 332 | distal end of prong |
| 334 | tab |
| 336 | boss |
| 338 | longitudinal rib |
| 340 | inside surface of prong |
| 342 | strut |
| 344 | outside surface of prong |
| 346 | planar disk portion |
| 348 | front surface of disk portion |
| 350 | rear surface of disk portion |
| 352 | outer periphery of disk portion |
| 354 | peripheral wall of adapter plate |
| 355 | central opening |
| 356 | second opening |
| 358 | circular flange |
| 360 | inner surface of circular flange |
| 362 | prong engagement member |
| 364 | end of peripheral wall |
| 366 | recessed area of adapter plate |
| 368 | first end of prong engagement member |
| 370 | second end of prong engagement member |
| 372 | inclined surface |
| 374 | nub |
| 376 | stop member |
| 378 | seat |
| 380 | boss in peripheral wall |
| 382 | shelf |
| 384 | bore |
| 386 | fastener |
| 388 | fastener |
| 390 | wall |
| 392 | aperture in disk |
| 394 | camera housing |
| 396 | threaded camera housing fastener |
| 397 | aperture in camera housing |
| 398 | adapter plate and camera assembly |
| 399 | directional arrow |
| D1 | diameter of sidewall of electrical box |
| D2 | distance tabs are recessed from rim |
| D3 | depth of recessed area of adapter plate |
| Θ1 | angle of rotation of flag to extend or retract |
| Θ2 | angle of rotation for securing adapter plate |
| Θ3 | angle of tabs from axis through narrow wall portions |

DETAILED DESCRIPTION OF THE INVENTION

Referring to FIG. 1 there is shown a first embodiment of an electrical box assembly 20 according to the present invention, with portions of the assembly exploded away for clarification. The electrical box assembly 20 includes a one-piece electrical box 22 with a sidewall 24 and a back wall 26 defining an electrical enclosure 28 therein. Sidewall 24 includes an end 29. A mounting arrangement 30, shown exploded away from the electrical box 22, includes mounting fasteners 32 and rotatable flags 34. The sidewall 24 of the electrical box 22 includes a sidewall end 29 and a flange 38 extending laterally from the sidewall end 29.

The one-piece electrical box 22 includes mounting bosses 40 that are integral with the sidewall 24. The mounting bosses 40 include bores 42 therein which are oversize with respect to the mounting fasteners 32, thus enabling the mounting fasteners 32 to turn freely in bores 42 after they are inserted there through. Each rotatable flag 34 is substantially rectangular shaped with a proximal end 44 at which it will be attached to the mounting fastener 32, a distal end 46, a bore 48 at the proximal end 44, a foot 50 at the distal end 46, and an outward extending tab 52 laterally from the rotatable flag 34 between the proximal end 44 and distal end 46. A flat face 54 provided on the foot 50 will face the flange 38 of the electrical box 22.

Figure 2:
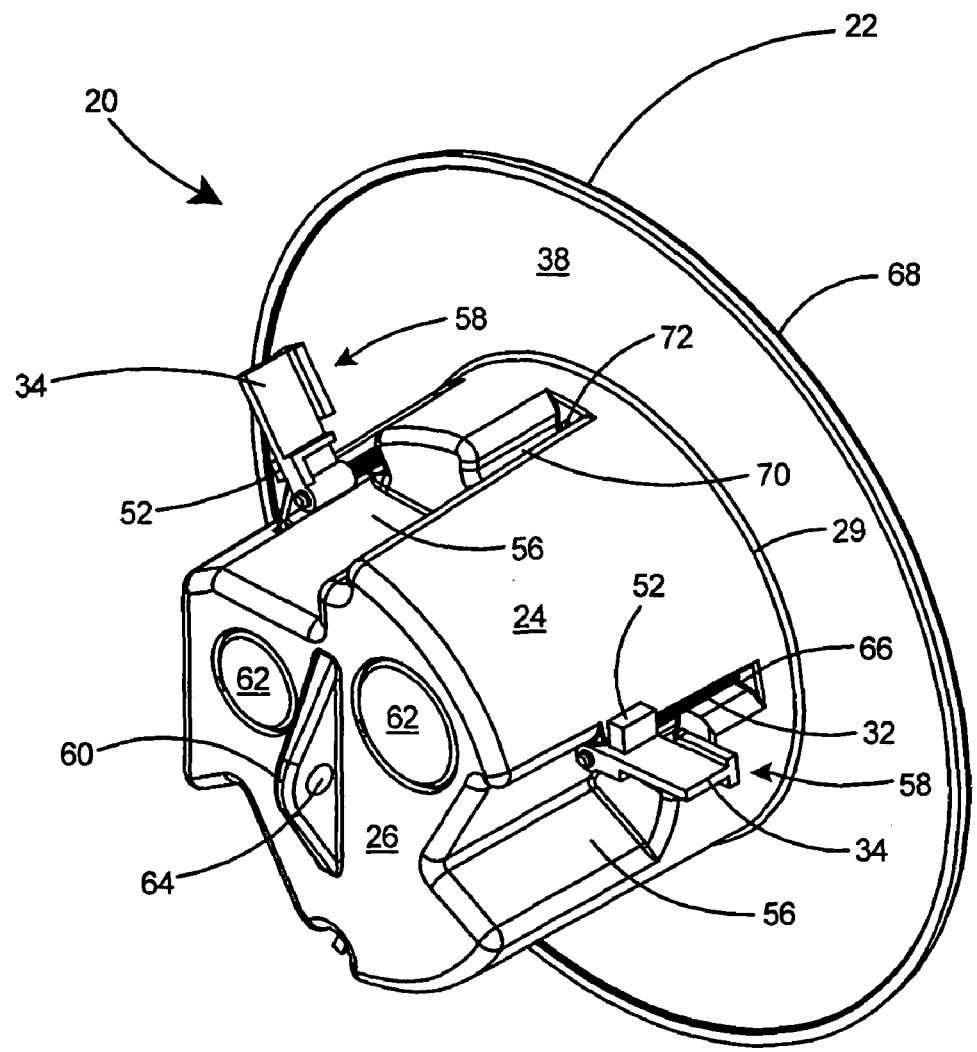
FIG. 2 is a top perspective view of the electrical box assembly of FIG. 1.

Referring to FIG. 2, the sidewall 24 of the electrical box assembly 20 includes a recessed area 56 corresponding to each of the rotatable flags 34 in the mounting arrangement 30. The rotatable flags 34 may be rotated outward or inward by rotating the mounting fasteners 32 slightly more than ¼ turn. In FIG. 2, the rotatable flags 34 are depicted rotated outward to the extended configuration 58. As shown in the top perspective view of FIG. 2, the electrical box 22 includes a tie-off bar 60 and one or more knockout areas 62 in the back wall 26. The tie-off bar 60 includes an aperture 64 therein for later attachment of a support wire (not shown) for supporting the electrical box 22 when a heavy load is suspended there from. The mounting fasteners 32 extend through open channels 66 that are adjacent each recessed area 56. When the mounting fasteners 32 are rotated clockwise as viewed from the open end of the electrical box 22, the tabs 52 engage sidewall 24 and continued clockwise rotation of the mounting fasteners will draw the rotatable flags 34 toward the flange 38 of the electrical box 22. Electrical box includes rim 68 at the outer periphery of the flange 38. Second channels 70 are provided in the sidewall 24 of the electrical box 22 in alignment with bores 72 leading from posts (not shown) within the enclosure of the electrical box.

Figure 3:
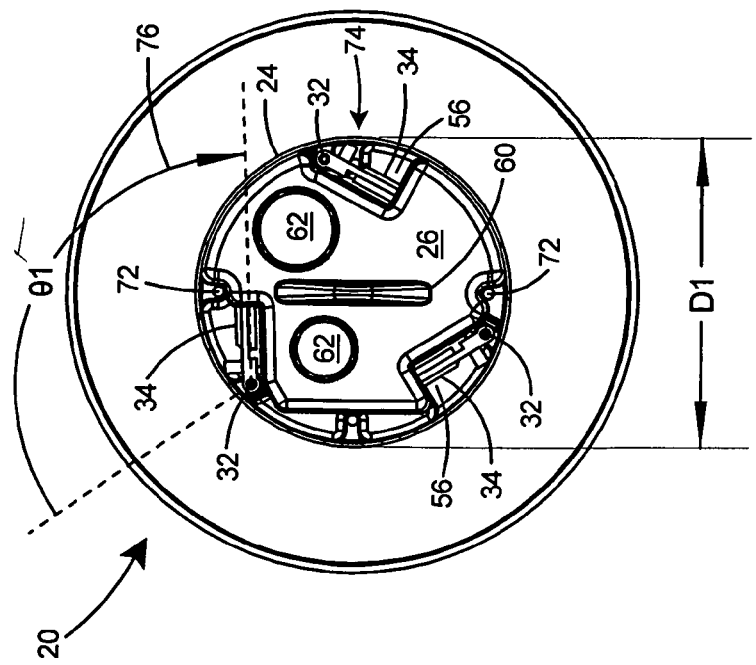
FIG. 3 is a top view of the electrical box assembly of FIG. 1 with the rotatable flags rotated inward for installation.

With reference to FIG. 3, the rotatable flags 34 of the electrical box assembly 20 can be rotated to a retracted configuration 74 wherein the rotatable flags 34 are rotated through angle $\Theta 1$ in the direction of arrow 76 until each flag 34 contacts the sidewall 24 of the electrical box 22 within the recessed area 56. With all three rotatable flags 34 rotated into the retracted configuration 74, all portions of the flags 34 are within the outer periphery of the sidewall 24 and the electrical box 22 will thus be configured for insertion through a circular hole in wallboard (not shown) created by a hole-saw.

Figure 4:
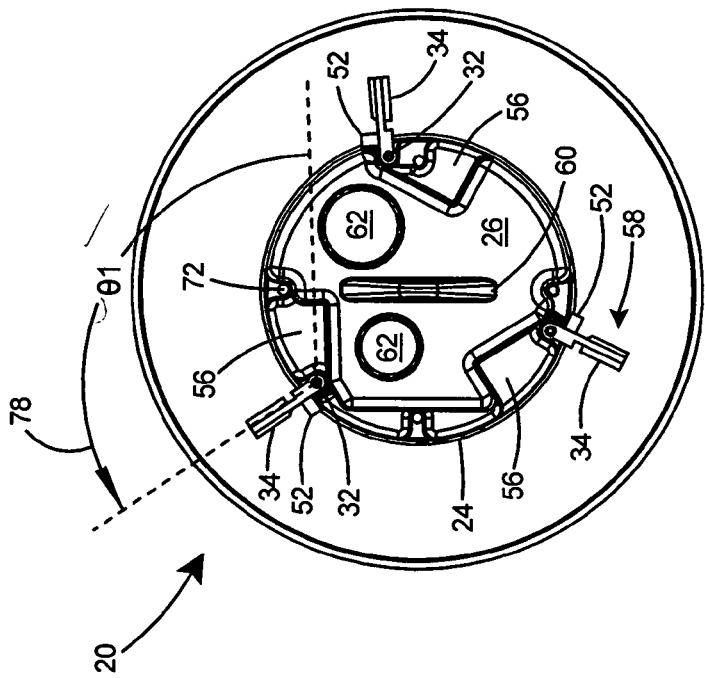
FIG. 4 is a top view of the electrical box assembly of FIG. 1 with the rotatable flags rotated outward to secure to a ceiling or wall.

FIG. 4 depicts the rotatable flags 34 rotated into their extended configuration 58 in which the wherein the rotatable flags 34 are rotated through angle $\theta 1$ in the direction of arrow 78 until each tab 52 of flag 34 contacts the sidewall 24 of the electrical box 22. With all three rotatable flags 34 rotated into the extended configuration 58, the electrical box 22 will thus be configured for tightening of the mounting fasteners 32 in order to draw the flags 34 tightly against the wallboard (not shown) and thus clamp the electrical box 22 to the wall or ceiling. Preferably, angle $\Theta 1$ is between 120 and 125 degrees.

Figure 5:
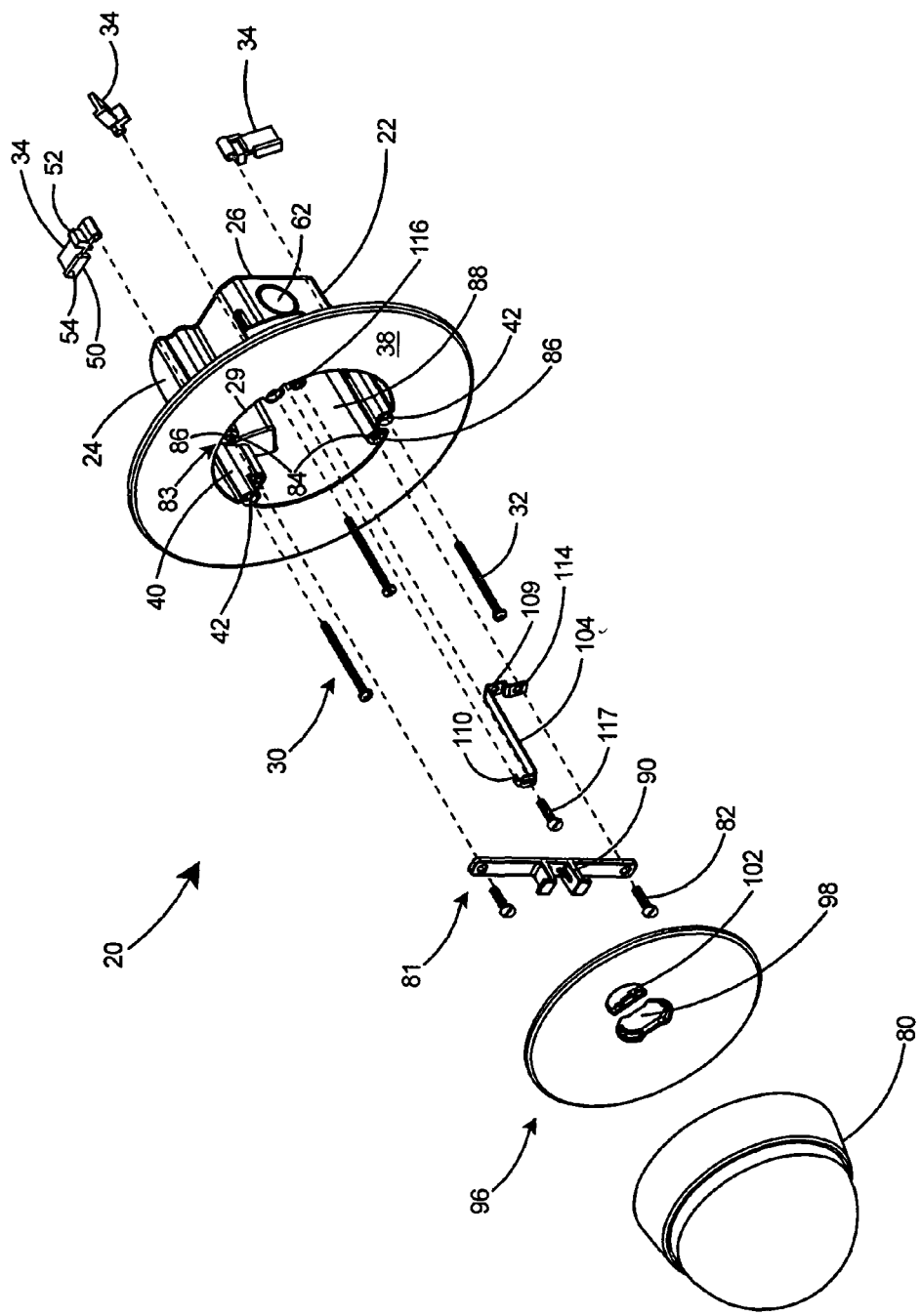
FIG. 5 is an exploded perspective view of the electrical box assembly of the present invention in alignment with a security camera that it will support.
Figure 13:
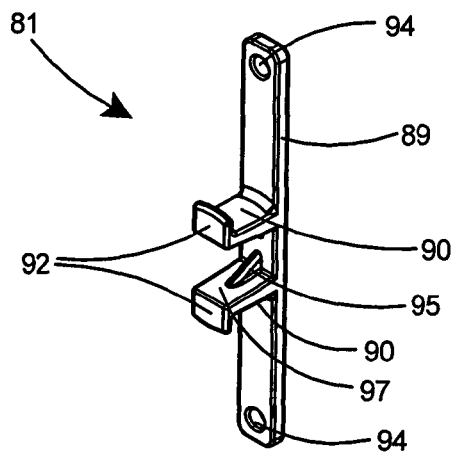
FIG. 13 is a perspective view of a mounting bar that can be used with the electrical box assembly of the present invention for mounting a security camera to the assembly.

With reference to FIG. 5, the electrical box assembly 20 of the present invention is depicted in alignment with a security camera 80 that it will support. The mounting fasteners 32 and rotatable flags 34 are shown exploded apart from the electrical box 22 for purposes of clarity. The electrical box assembly 20 is normally supplied with the mounting fasteners 32 extending through the mounting bosses 40 and the rotatable flags 34 attached to the ends of the mounting fasteners 32. In order to support the security camera 80, electrical box assembly 20 includes a mounting bar 81 that is secured with bar fasteners 82 to a fastening arrangement 83 for securing an electrical device (not shown) to the electrical box 22. The mounting bar 81 is an elongated bar preferably constructed of plastic and most preferably the type of plastic the mounting bar 81 is constructed of is polycarbonate. The fastening arrangement 83 for fastening an electrical device to the electrical box 22 includes posts 84 that are integral with the sidewall 25 of the electrical box 22. Posts 84 including bores 86 therein are arranged approximately 180 degrees across the opening 88 of the electrical box 22. As shown in FIG. 13, the mounting bar 81 includes an elongated base 89, two prongs 90 extending from the base 89, tabs 92 extending at a right angle from the prongs 90, and apertures 94 for accommodating bar fasteners 82. Two struts 95 extend from the mounting bar 81 to the inside surface 97 of the prongs 90 to stiffen and support them.

Figure 15:
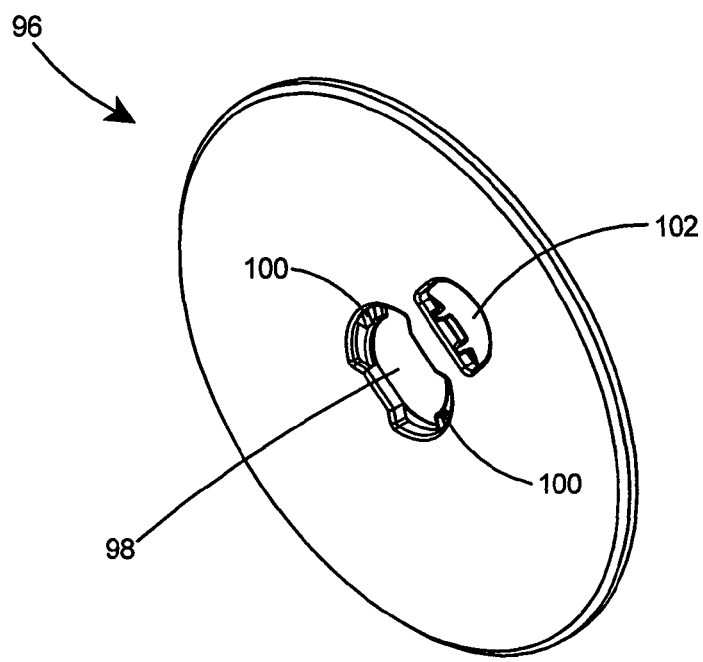
FIG. 15 is a perspective view of an adapter plate that forms a portion of the electrical box assembly for mounting a security camera thereto.

As shown in FIG. 5, the fastening arrangement 83 of the electrical box assembly 20 further includes an adapter plate 96. The adapter plate 96 includes a central aperture 98 for interacting with the prongs 90 of the mounting bar 81. As shown in FIG. 15, the adapter plate 96 includes flanges 100 extending into the central aperture 98. A wiring aperture 102 is provided on the adapter plate 96 for accommodating the passage of electrical wiring (not shown) between the security camera and the electrical box.

Figure 14:
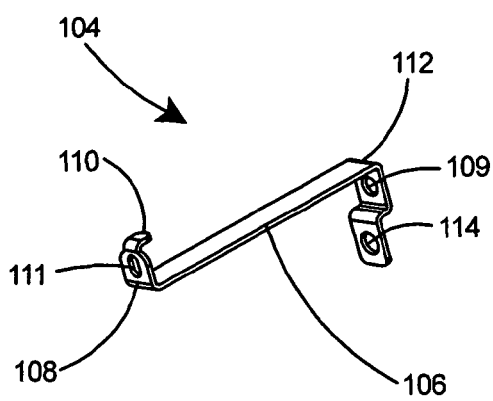
FIG. 14 is a perspective view of a grounding strap that can be used with the electrical box assembly of the present invention.

Referring to FIG. 5, a ground strap 104 is shown in alignment with a post 84 in the electrical box 22. The ground strap 104 is constructed of metal and is provided to enable the electrical box assembly 20 to meet code in certain jurisdictions where a ground wire must be connected within a non-metallic electrical box. As shown in FIG. 14, the ground strap 104 includes a central bar 106 with two bent over ends including a first 108 and second end 109. A tab 110 and aperture 111 are provided on the first end 108 and a first aperture 112 and second aperture 114 in the second end 109. As shown in FIG. 5, electrical box 22 includes a groove 116 therein against the sidewall end 29 at the opening 88 of the electrical box. Tab 110 of ground strap 104 clips into groove 116 in electrical box 22 to hold the ground strap 104 to the electrical box 22. Connection of ground strap 104 to electrical box 22 could also be by screw 117 as shown. A ground wire (not shown) can be connected to the second end 109 of the ground strap 104 to provide electrical continuity to any electrical fixture or device that is secured to the electrical box 22. The second aperture 114 provides a place for connecting the ground wire via screw (not shown) or similar fastener.

Figure 6:
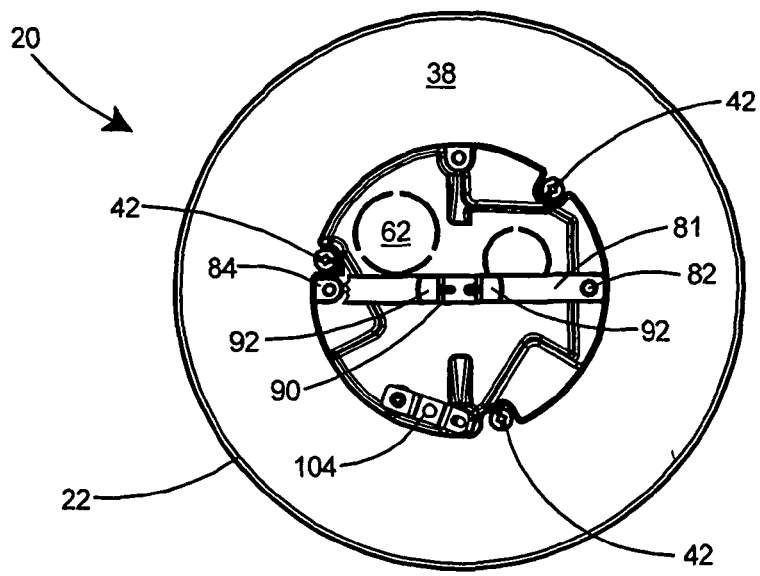
FIG. 6 is a bottom view of the electrical box assembly including the mounting bar for the adapter plate and the ground strap attached thereto.

As shown in FIG. 6, the first step in preparing the electrical box assembly 20 for receipt of a security camera (not shown) is to secure mounting bar 81 to posts 84. A portion of mounting bar 81 is broken away on the left side of the figure to show post 84, which is connected to the electrical box 22 by bar fasteners 82, one of which is depicted on the right side of the figure.

Figure 7:
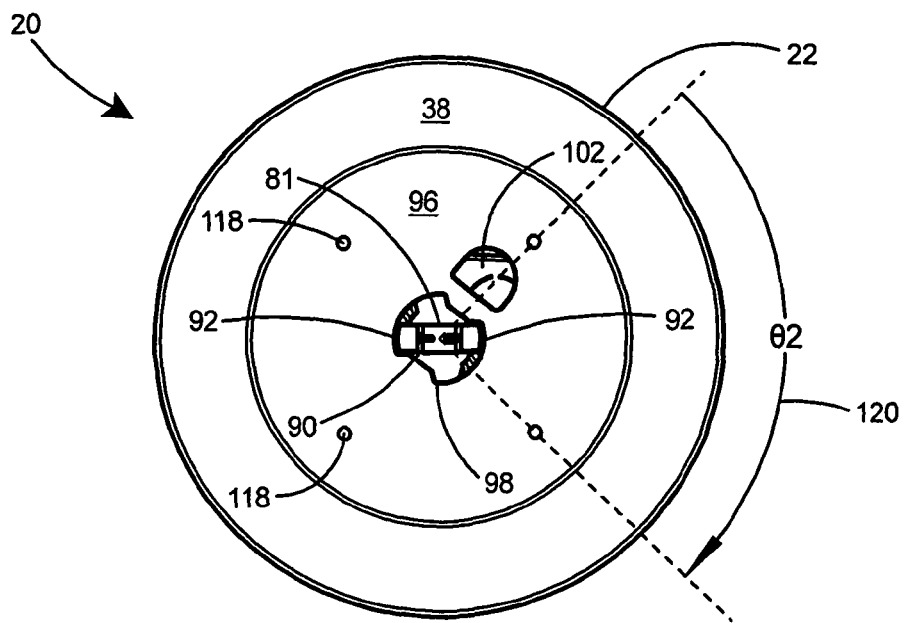
FIG. 7 is a bottom view of the electrical box assembly with the adapter plate secured thereto.

With reference to FIG. 7, after the mounting bar 81 is secured to the electrical box assembly 20, apertures 118 are drilled in the adapter plate 96 by the installer to match the pattern of posts or similar connection devices (not shown) on the security camera to prepare the adapter plate 96 for connection to the security camera. The security camera is then secured to the adapter plate 96 with fasteners (not shown). Adapter plate 96 with attached security camera is then secured to the electrical box assembly 20 by placing the central aperture 98 over the tabs 92 and prongs 90 on the mounting bar 81 and turning the adapter plate 96 through angle $\Theta 2$ or approximately one-quarter turn in the direction as shown by directional arrow 120.

Figure 8:
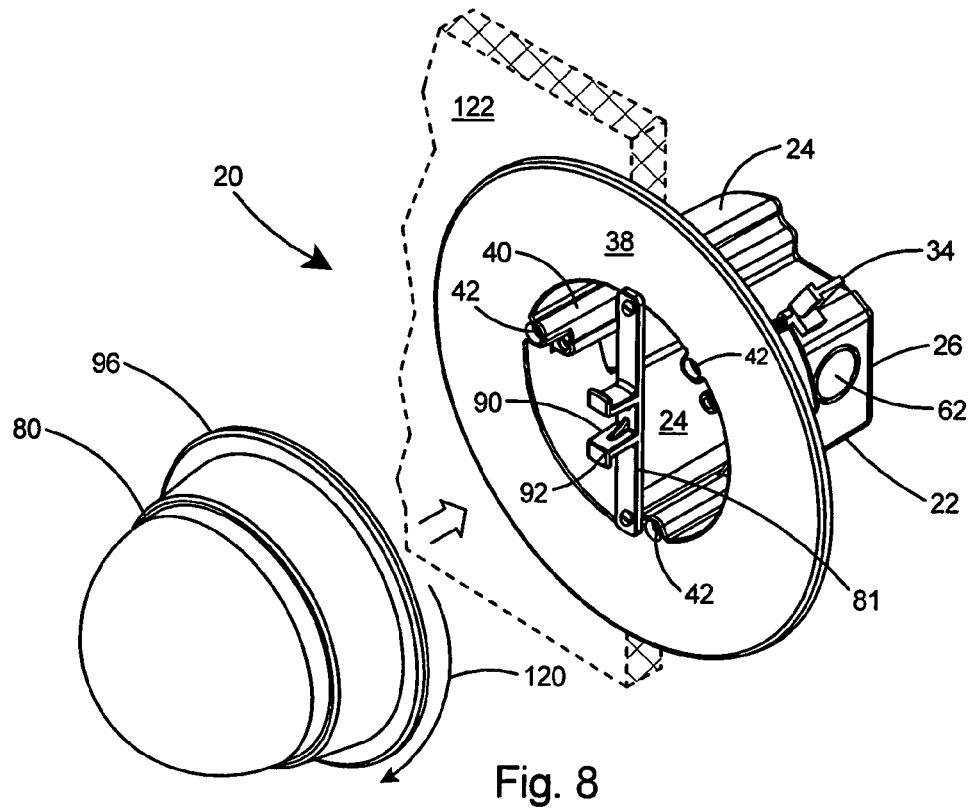
FIG. 8 is a perspective view of the electrical box assembly secured to a ceiling with an attached adapter plate and a security camera in alignment to be secured to the electrical box.

As shown in FIG. 8, after the electrical box 22 has been secured to a ceiling 122, a broken away portion of which ceiling 122 is shown, and adapter plate 96 has been secured to the electrical box assembly 20, the security camera 80 is aligned with the adapter plate 96 and secured thereto by inserting the security camera 80 over the prongs 90 and tabs 92 of the mounting bar 81 and turning approximately ¼ turn in the direction of arrow 120.

Figure 9:
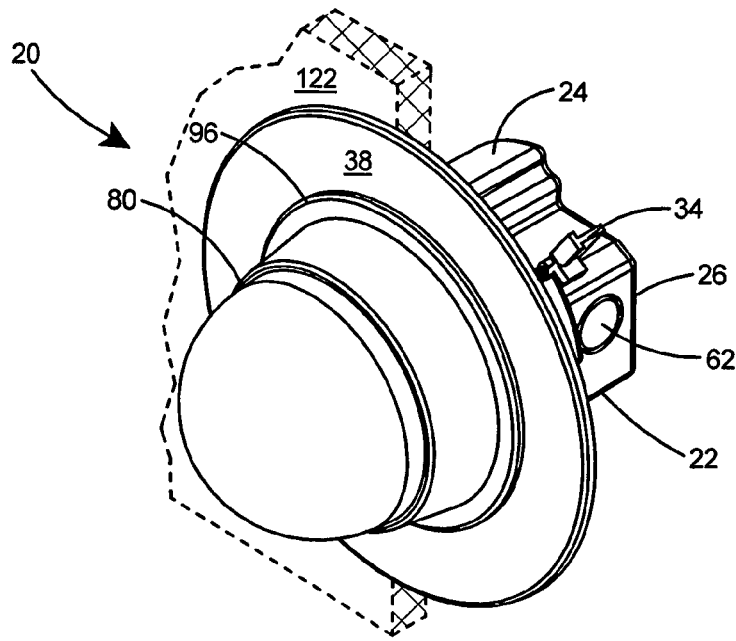
FIG. 9 is a perspective view of the electrical box assembly of FIG. 7 after the electrical box has been secured to the ceiling and a security camera secured to the electrical box assembly.

With reference to FIG. 9, the security camera 80 is shown secured to the electrical box assembly 20 which in turn is secured to the ceiling 122. Rotatable flags 34, one of which is shown, have been fully tightened against the ceiling 122 to securely hold electrical box assembly 20 and attached security camera 80 to the ceiling 122. Although the operating procedure for installing electrical box assembly 20 and security camera 80 depicted in FIGS. 8 and 9 are described with respect to a ceiling, it should be understood that electrical box assembly 20 could also be used to install a security camera 80 or similar electrical device on a wall.

Figure 10:
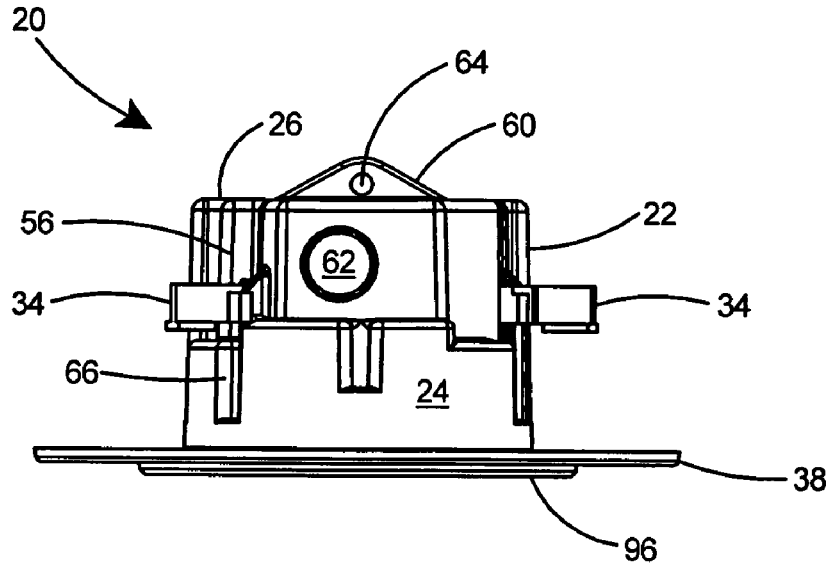
FIG. 10 is a side view of the electrical box assembly of the present invention.
Figure 11:
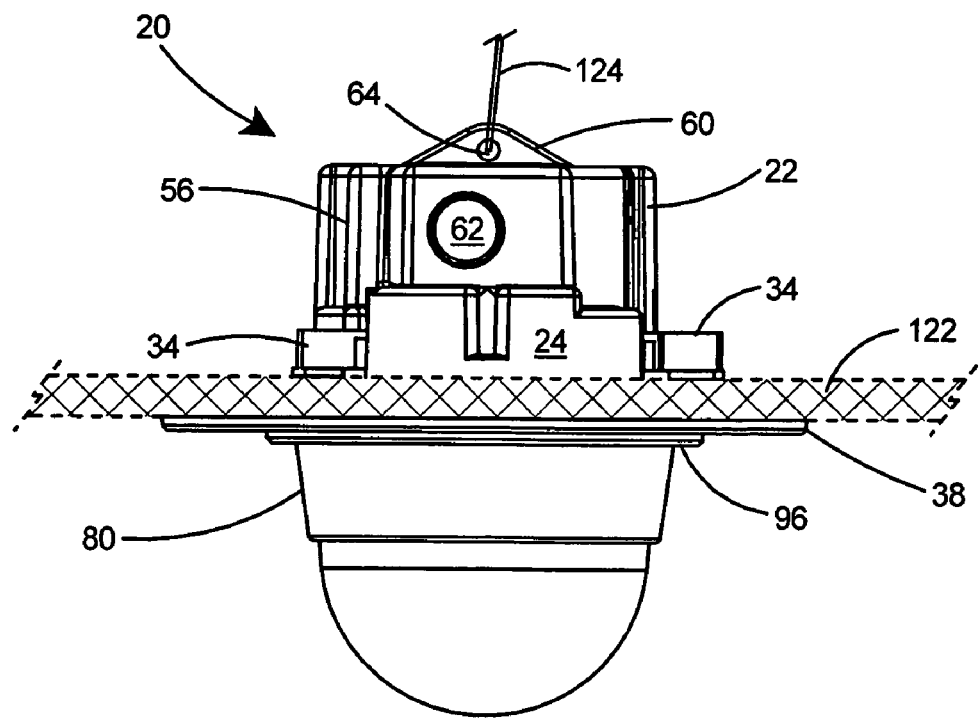
FIG. 11 is a side view of the electrical box assembly with a security camera attached thereto.

Referring to FIG. 10, the back wall 26 of the electrical box 22 includes tie-off bar 60 extending there from. Tie-off bar 60 includes an aperture 64 therein. As shown in FIG. 11, after electrical box assembly 20 has been secured to the wallboard of ceiling 122, a support wire 124 can be attached to the tie-off bar 60 at aperture 64 to provide support for the security camera 80. The support wire 124 is especially useful for supporting the weight of heavy electrical fixtures that may be attached to the electrical box assembly 20, such as a light fixture (not shown).

Figure 12:
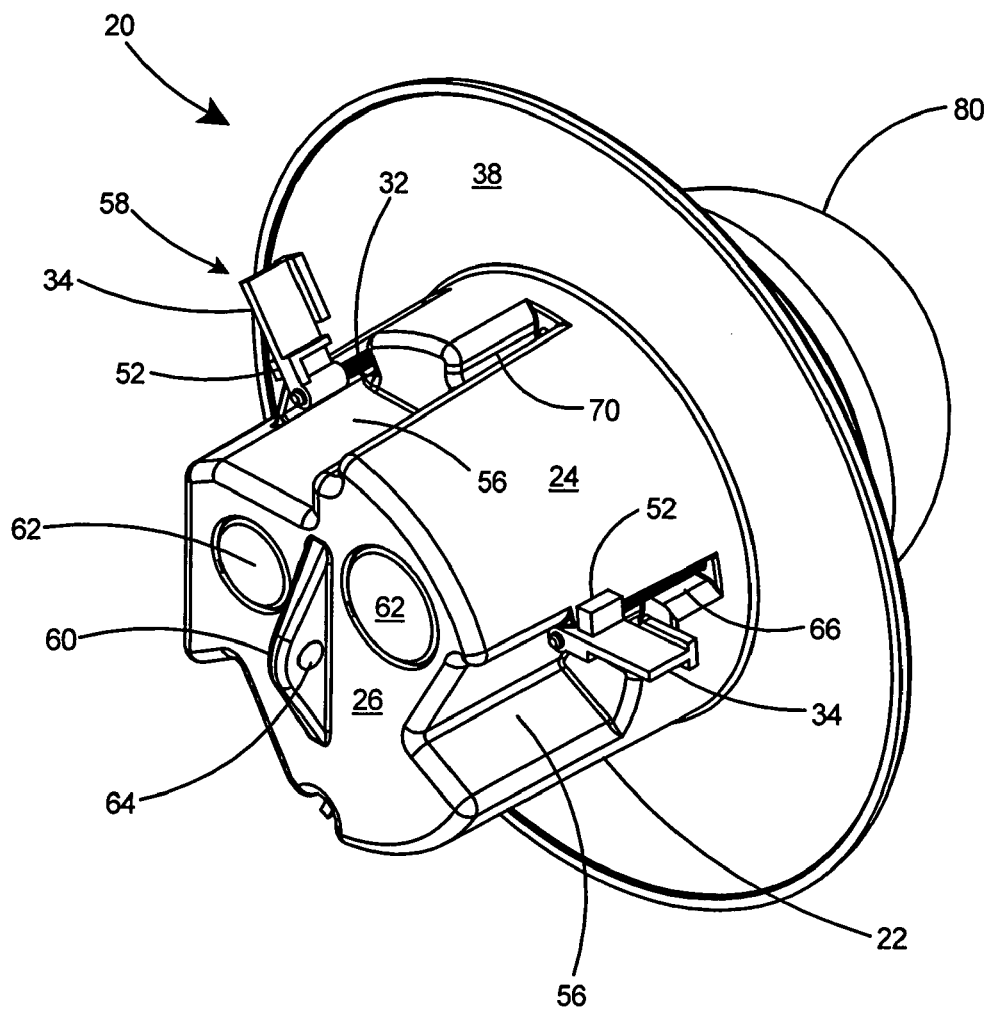
FIG. 12 is a perspective view of the electrical box assembly and security camera of FIG. 10.

With reference to the rear perspective view of the electrical box assembly 20 in FIG. 12, there is shown the mounting fasteners 32 and rotatable flags 34 in the extended configuration 58. Rotatable flags 34 have been rotated to the extended configuration 58 at which tab 52 of rotatable flag 34 engages the sidewall 24 of the electrical box 22. Knockout areas 62 can be removed to provide an aperture for leading electrical cable (not shown) into the electrical box 22. As each mounting fastener 32 is tightened to draw the rotatable flag 34 toward flange 38, open channel 66 acts as a guide for the rotatable flag 34 to ride along the sidewall 24 and proceed down the channel 66 until the flag 34 engages the wall or ceiling (not shown).

As shown in FIG. 3, the sidewall 24 of the electrical box 22 includes an outer diameter D1. Preferably, the shape of sidewall 24 is circular and diameter D1 of sidewall 24 is slightly less than the size of a conventional hole-saw of a standard size. For example, for use with a 4.0-inch hole-saw, diameter D1 of sidewall 24 is slightly less than 4.0 inches. With rotatable flags 34 rotated into recesses 56 of sidewall 24, thus to their retracted configuration 74 as shown in FIG. 3, sidewall 24 of electrical box 22 can be easily inserted within a 4.0"-inch hole in a wall created by a conventional 4-inch hole-saw. For other sizes of electrical boxes 22 according to the present invention, the size of the sidewall 24 would be adjusted to a size slightly less than the size of the hole-saw that it is designed to be used in conjunction with.

Figure 16:
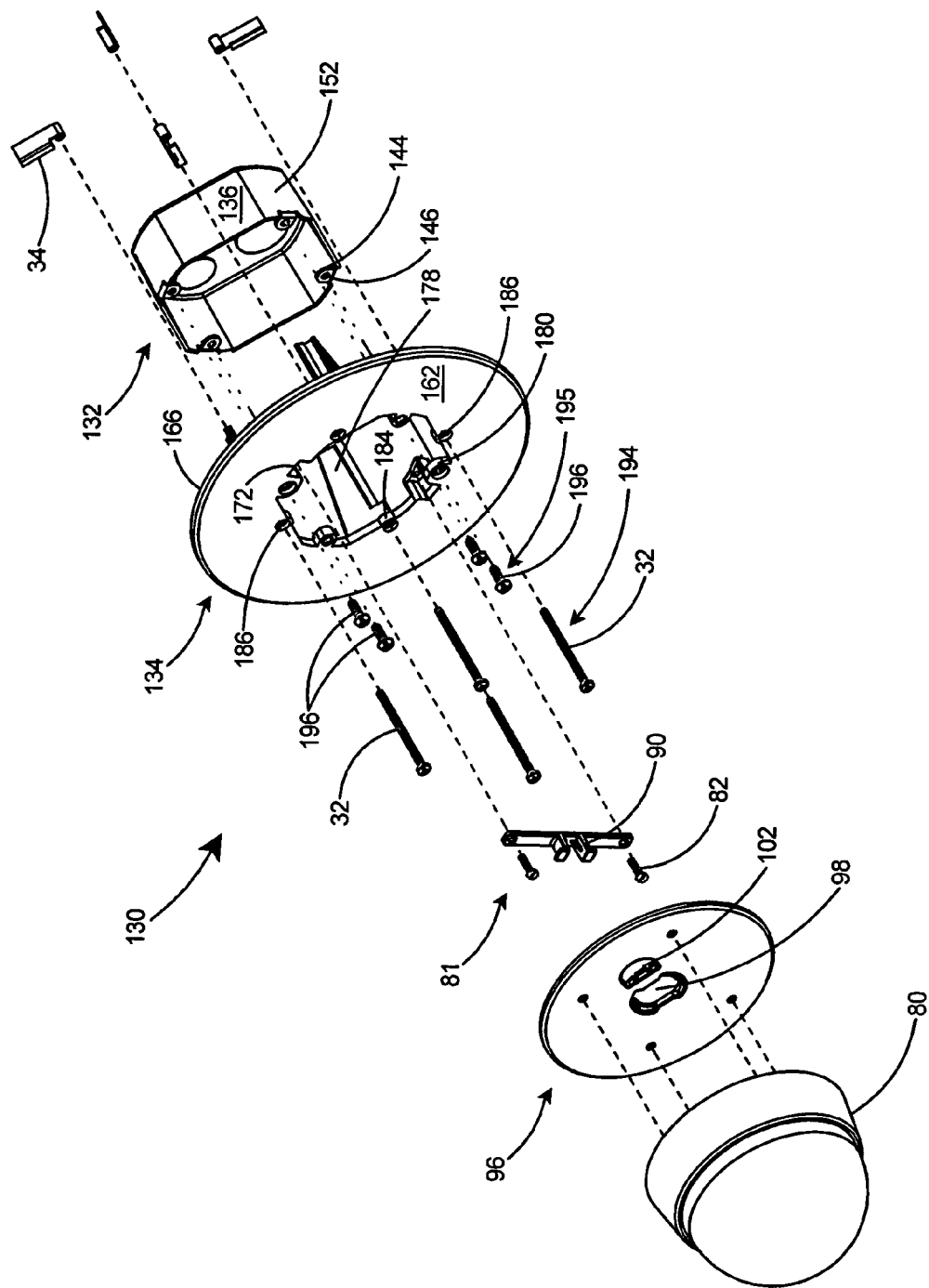
FIG. 16 is an exploded perspective view of a second embodiment of an electrical box assembly according to the present invention.

With reference to FIG. 16 there is shown a second embodiment of an electrical box assembly 130 according to the present invention. The electrical box assembly 130 includes a metallic electrical box 132 that enables the assembly to meet electrical codes in those areas that require metallic boxes. The electrical box assembly 130 includes a trim piece 134 for attachment to the electrical box 132 and a mounting bar 81 and adapter plate 96 for securing an electrical fixture or security camera 80 to the assembly.

Figure 17:
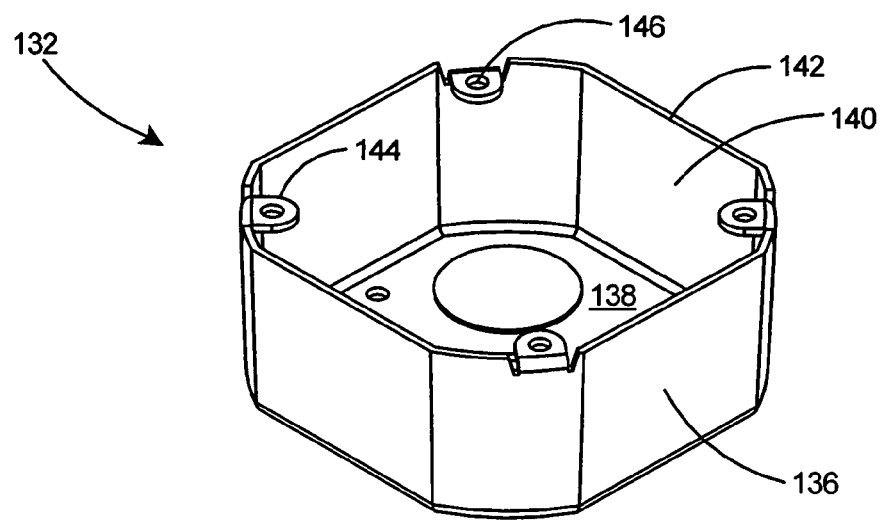
FIG. 17 is a front perspective view of an electrical box that forms a portion of the electrical box assembly in FIG. 16.
Figure 18:
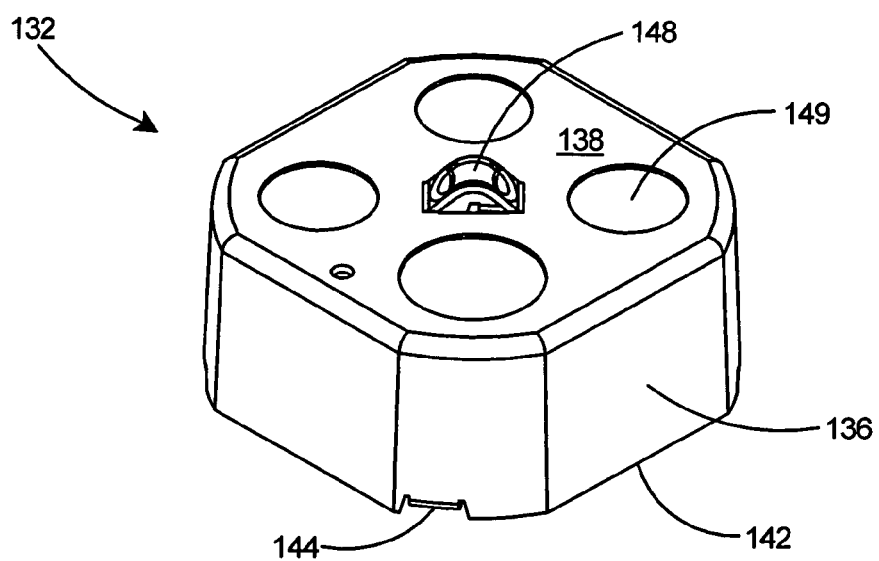
FIG. 18 is a rear perspective view of the electrical box of FIG. 17.

Referring to FIGS. 17 and 18, the electrical box 132 includes a sidewall 136 and a back wall 138 defining an electrical enclosure 140 therein. The end of the sidewall 136 terminates in a rim 142. A plurality of tabs 144 extend from the sidewall 136 of the electrical box 132 into the electrical enclosure 140. Each of the tabs 144 of the electrical box 132 includes a bore 146 therein. As shown in FIG. 18, the electrical box 132 includes a tie-off bar 148 extending from the back wall 138 and one or more knockout wall portions 149. A chain (not shown), cable, or similar device can be attached to the tie-off bar 148 and secured to a support structure in order to provide additional support for the electrical box assembly 130 such as for heavy electrical fixtures.

As shown in FIG. 19, the sidewall 136 of the electrical box 132 is of substantially octagonal shape and includes four wide sidewall portions 150 and four narrow sidewall portions 152.

Each of the narrow sidewall portions 152 form a corner 154 on the octagonal shaped electrical box 132. As shown in FIG. 20, the tabs 144 of the electrical box 132 are formed by bending over a portion of the sidewall 136. A V-shaped cut 156 is formed in the sidewall 136 on each side of tab 144 and the tabs 144 are preferably recessed a distance D2 from the rim 142. Recessed distance D2 of the tab 144 is preferably at least 0.046 inch. As shown in FIG. 19, two of the tabs 144 are canted away from an axis 157 through the center of two of the opposing narrow sidewall portions 152. The tabs 144 are canted away from axis 157 by angle Θ3, which angle is preferably at least 8 degrees. The narrow sidewall portions 152 are of arcuate shape and include an outer surface 158. The distance between the outer surfaces 158 of the arcuate shaped narrow sidewall portions 152 is less than the diameter of a standard size hole-saw. As shown in FIG. 19, the outer surfaces 158 of the narrow wall portions 152 fall in a circle or radius of extent 160 that is preferably sized less than the diameter of a standard size hole-saw (not shown).

Figure 22:
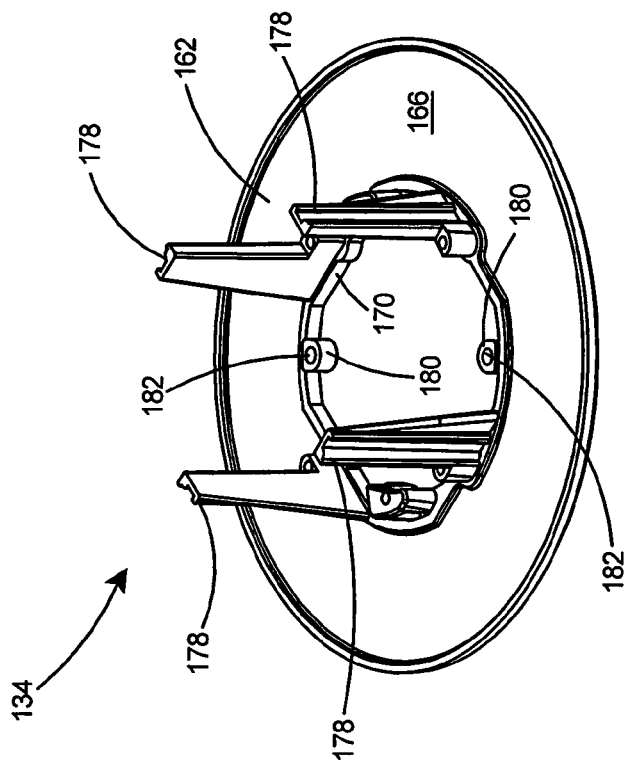
FIG. 22 is a rear perspective view of the trim piece of FIG. 21.
Figure 21:
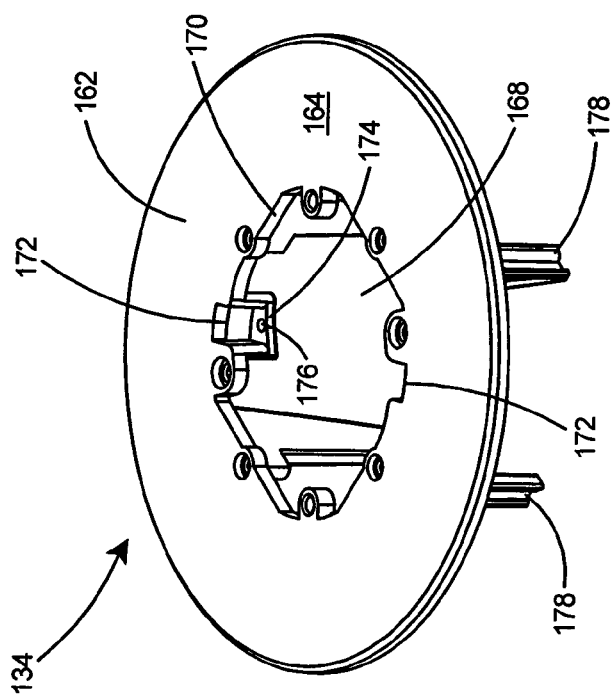
FIG. 21 is a front perspective view of a trim piece that forms a portion of the electrical box assembly in FIG. 16.

With reference to FIGS. 21 and 22, the trim piece 134 includes a flange 162 with a front surface 164, a rear surface 166, a central opening 168 therein, and an inner perimeter 170 surrounding the opening 168. The trim piece 134 further includes two channels 172 in opposing sides of the inner perimeter 170 and a shelf 174 at each of the channels 172. The shelf 174 is planar, parallel with respect to the flange 162, is recessed a distance from the flange 162 and includes a bore 176 therein. As shown in FIG. 22, the trim piece 134 includes a plurality of legs 178 on the inner perimeter 170 of the flange 162. The legs 178 extend from the rear surface 166 of the flange 162. The trim piece 134 further includes a plurality of second bosses 180 extending from the rear surface 166 of the flange 162 at the inner perimeter 170 with each of the second bosses 180 including a bore 182 therein.

Figure 23:
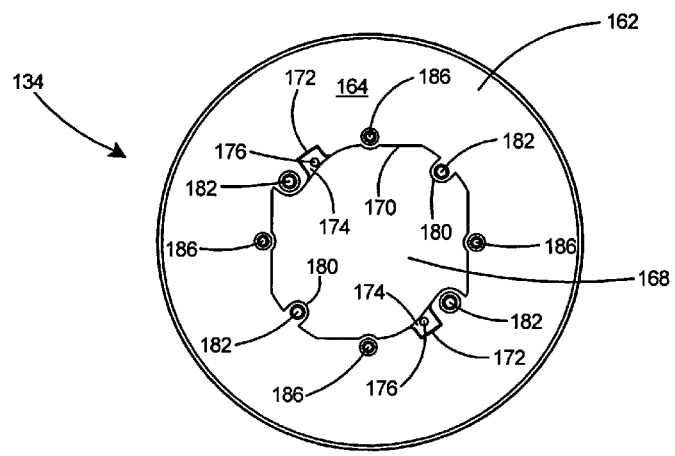
FIG. 23 is a front elevation view of the trim piece.
Figure 24:
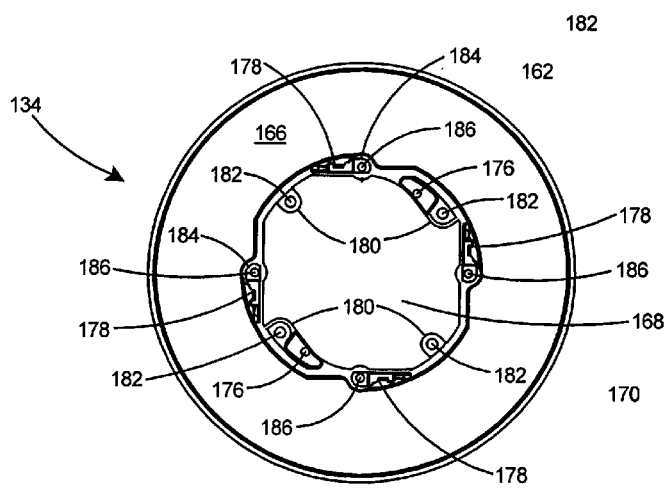
FIG. 24 is a rear elevation view of the trim piece.

As shown in FIGS. 23 and 24, the trim piece 134 includes a plurality of mounting bosses 184 integral with the legs 178 and the flange 162 with each of the mounting bosses 184 including a bore 186 therein. The bores 186 in the mounting bosses 184 of the trim piece 134 are oversize with respect to the mounting fasteners (not shown) that will be inserted there through thus enabling the mounting fasteners to turn freely in the bores 186 and thus with respect to the trim piece 134. Second bosses 180 include bores 182 therein in the flange 162 adjacent the inner perimeter 170 for securing the trim piece 134 to the electrical box (not shown). The second bosses 180 are located on tabs 192 that extend into the opening 168 from the inner perimeter 170 of the trim piece.

Figure 25:
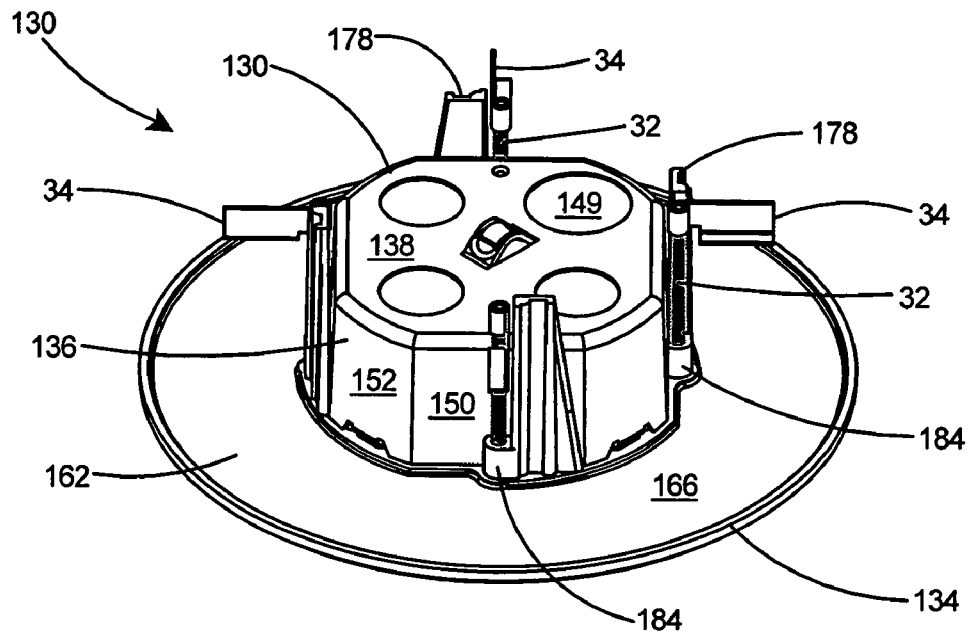
FIG. 25 is a rear perspective view of the second embodiment of the electrical box assembly of FIG. 23.

With reference to FIG. 25, there is shown the second embodiment of the electrical box assembly 130 according to the present invention with the trim piece 134 secured to the electrical box 132. The electrical box assembly 130 includes a mounting arrangement 194 for securing the assembly to a wall (not shown). The mounting arrangement 194 includes a mounting fastener 32 extending through each of the mounting bosses 184 in the trim piece 134. A rotatable flag 34 is secured to each of the mounting fasteners 32. The legs 178 of the trim piece 134 and the mounting fasteners 32 include a length such that the rotatable flags 34 extend beyond the back wall 138 of the electrical box 132.

Figure 26:
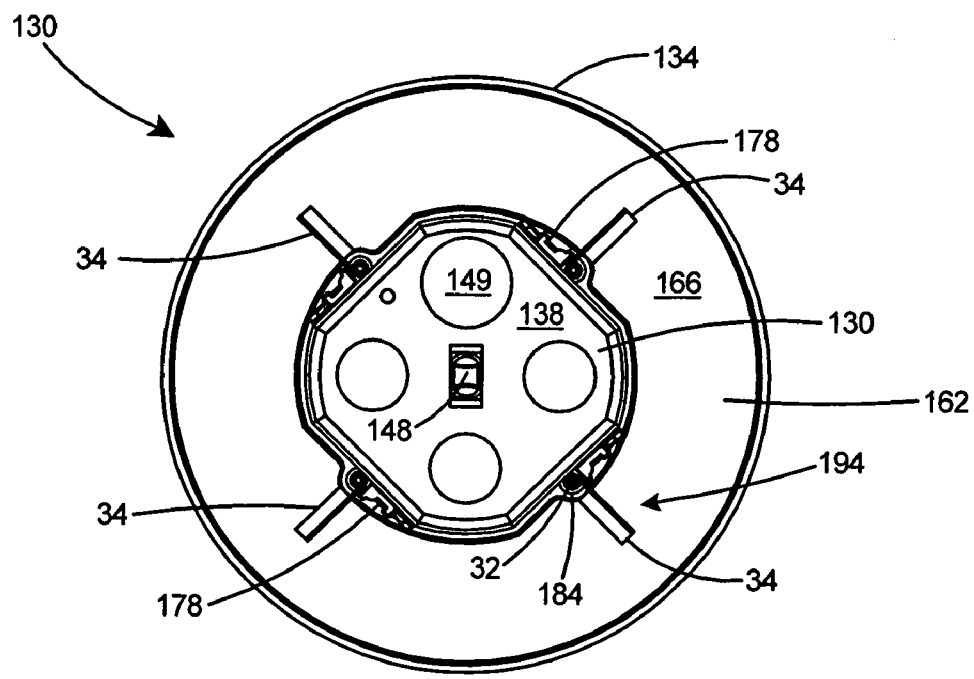
FIG. 26 is a rear elevation view of the second embodiment of the electrical box assembly according to the present invention.

As shown in FIG. 26, the rotatable flags 34 can be rotated to a retracted configuration 74, which includes the flags 34 rotated to a position completely within a circle described by a standard 4.0-inch hole-saw. Placing the rotatable flags 34 in the retracted configuration 74 enables easy insertion of the sidewall 136 of the electrical box 132 within the circular hole in a wall created by the conventional 4.0-inch hole-saw.

As shown in FIG. 25, the electrical box assembly 130 is depicted with the rotatable flags 34 in an extended configuration 58. The mounting fasteners 32 can be rotated clockwise to place the rotatable flags 34 in the extended configuration 58.

For operation of the electrical box assembly 130 of the present invention reference is made to FIG. 16. The electrical box assembly 130 includes the electrical box 132, the trim piece 134, the mounting bar 81, and the adapter plate 96. The electrical box assembly 130 is provided with the plastic trim piece 134 secured to the metallic electrical box 132 by fasteners 196 secured through second bosses 180 of trim piece 134 into tabs 144 of electrical box 132. A round hole (not shown) is made in the wall in the desired location by using a hole-saw of the recommended size to make a circular hole in the drywall. As an example, for use with a standard 4-inch hole-saw, the sidewall 136 of an electrical box 132 according to the present invention would preferably include a diameter across the narrow sidewall portions 152 of 3.95 inches. Electrical cable and leads are pulled into the electrical box 132. The mounting fasteners 32 of the electrical box assembly 130 are then rotated counterclockwise to place rotatable flags 34 in their retracted configuration (see FIG. 26). The rear portion of the assembly is then inserted through the wall opening. After rear surface 166 of flange 162 is flush against the wall, the mounting fasteners 32 are rotated clockwise to place rotatable flags 34 in their extended configuration 58 (see FIG. 25). All four mounting fasteners 32 are then rotated fully clockwise until the rotatable flags 34 are drawn securely against the drywall and the electrical box 132 and trim piece 134 are secure to the wall.

Figure 27:
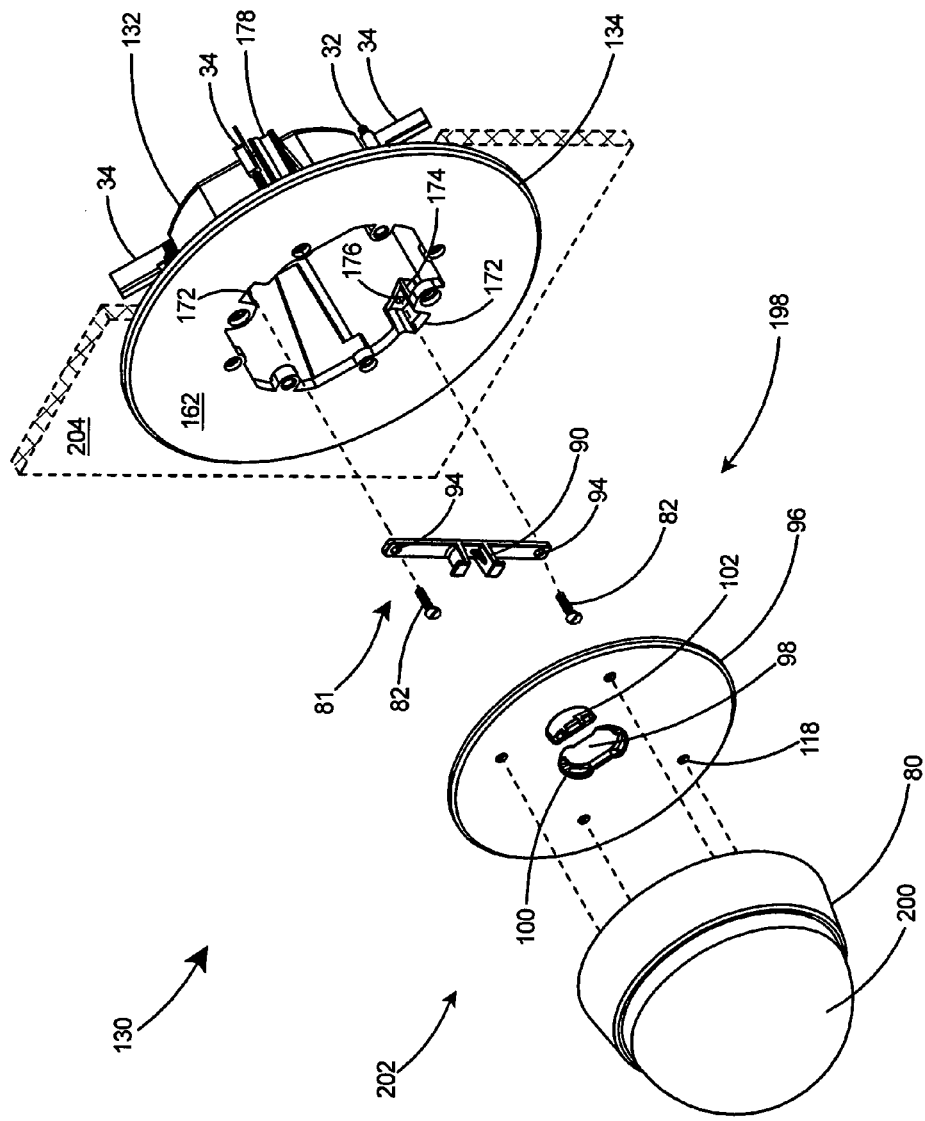
FIG. 27 is a perspective view of the second embodiment of the electrical box assembly with the electrical box and trim piece assembled together and a security camera in alignment to be attached thereto.

With reference to FIG. 27, the installer then drills holes 118 as appropriate in the adapter plate 96 to mount the security camera 80 to the adapter plate 96. The front cover 200 portion of security camera 80 can be removed to facilitate attachment of the camera 80 to the adapter plate 96. Mounting bar 81 is then aligned with channels 172 and secured to the electrical box assembly 130 by driving bar fasteners 82 through apertures 94 in mounting bar 81 and into bores 176 in the shelf portion 174 of trim piece 134. Shelf 174, being recessed behind the flange 162, positions mounting bar 81 and bar fasteners 82 securely within the channels 172 and insures that the mounting bar 81 and bar fasteners 82 will not project beyond flange 162 and that adapter plate 96 will therefore fit flush against the flange 162 portion of the electrical box assembly 130.

After mounting bar 81 is secured to the electrical box assembly 130, wiring connections are completed from the leads (not shown) in the electrical enclosure 140 to the leads extending from camera 80 through wiring aperture 102 in adapter plate 96. The installation is completed by inserting the camera 80 and adapter plate 96 assembly onto the prongs 90 of the mounting bar 81 and electrical box assembly 30. Camera 80 and adapter plate 96 are installed to the assembly 130 by aligning central aperture 98 of adapter plate 96 with prongs 90 of mounting bar 81, pressing the adapter plate 96 over the prongs 90 with the prongs 90 extending through central aperture 98, and rotating camera/plate assembly one-quarter turn clockwise with respect to the electrical box assembly 130 for twist locking engagement of the adapter plate 96 to the mounting bar 81 and thus to the electrical box assembly 130. Flanges 100 extending into central aperture 98 of adapter plate 96 provide a cam action to lock adapter plate 96 onto the prongs of adapter bar 81.

With reference to FIG. 16, the electrical box assembly 130 includes a fastening arrangement 195 for securing the trim piece 134 to the electrical box 132. The fastening arrangement 195 includes a plurality of fasteners 196 extending through the flange 162 of the trim piece 134 into the bores 146 in the tabs 144 of the electrical box 132. The electrical box assembly 130 also includes a mounting arrangement 194 for securing the electrical box 132 to a support. The mounting arrangement 194 includes a plurality of mounting bosses 184 integral with the legs 178 and the flange 162 of the trim piece 134. Each of the mounting bosses 184 include a bore 186 therein.

The rotatable flags 34 of the second embodiment of the electrical box assembly 130 are equivalent to the rotatable flags of the first embodiment 20 and, as shown in FIG. 1, include a proximal end 44, a distal end 46, a bore 48 in the proximal end 44, a tab 52 extending laterally from the rotatable flag 34 between the proximal end 44 and the distal end 46, and a foot 50 including a flat face 54 at the distal end 46.

As shown in FIG. 27, the electrical box assembly 130 includes a second fastening arrangement 198 for securing an electrical device 80 to the electrical box assembly 130. The second fastening arrangement 198 includes a mounting bar 81 and an adapter plate 96. The mounting bar 81 includes apertures 94 therein and bar fasteners 82 for securing through apertures 94 in mounting bar 81 into the bores 176 in shelf 174 of the electrical box assembly 130. Mounting bar 81 is first secured to the electrical box assembly 130. After adapter plate 96 is secured to the security camera 80 or to an electrical fixture (not shown), the camera and adapter plate assembly 202 is secured to the electrical box assembly 130 by placing central aperture 98 of adapter plate 96 over prongs 90 and rotating the camera and plate assembly 202 one-quarter turn to lock the camera 80 to the electrical box assembly 130 and to the wall 204, a portion of which wall is shown. In the second embodiment, the electrical box 132, mounting bar 81 and adapter plate 96 are preferably constructed of metal and the trim piece 134 is preferably molded in one piece of plastic. Each of the rotatable flags 34 are molded in one piece of plastic. Preferably, the plastic is polycarbonate, polyvinyl chloride, acrylonitrile-butadiene styrene, or polyethylene. Preferably the mounting fasteners are #6×2-inch sheet metal screws.

Figure 28:
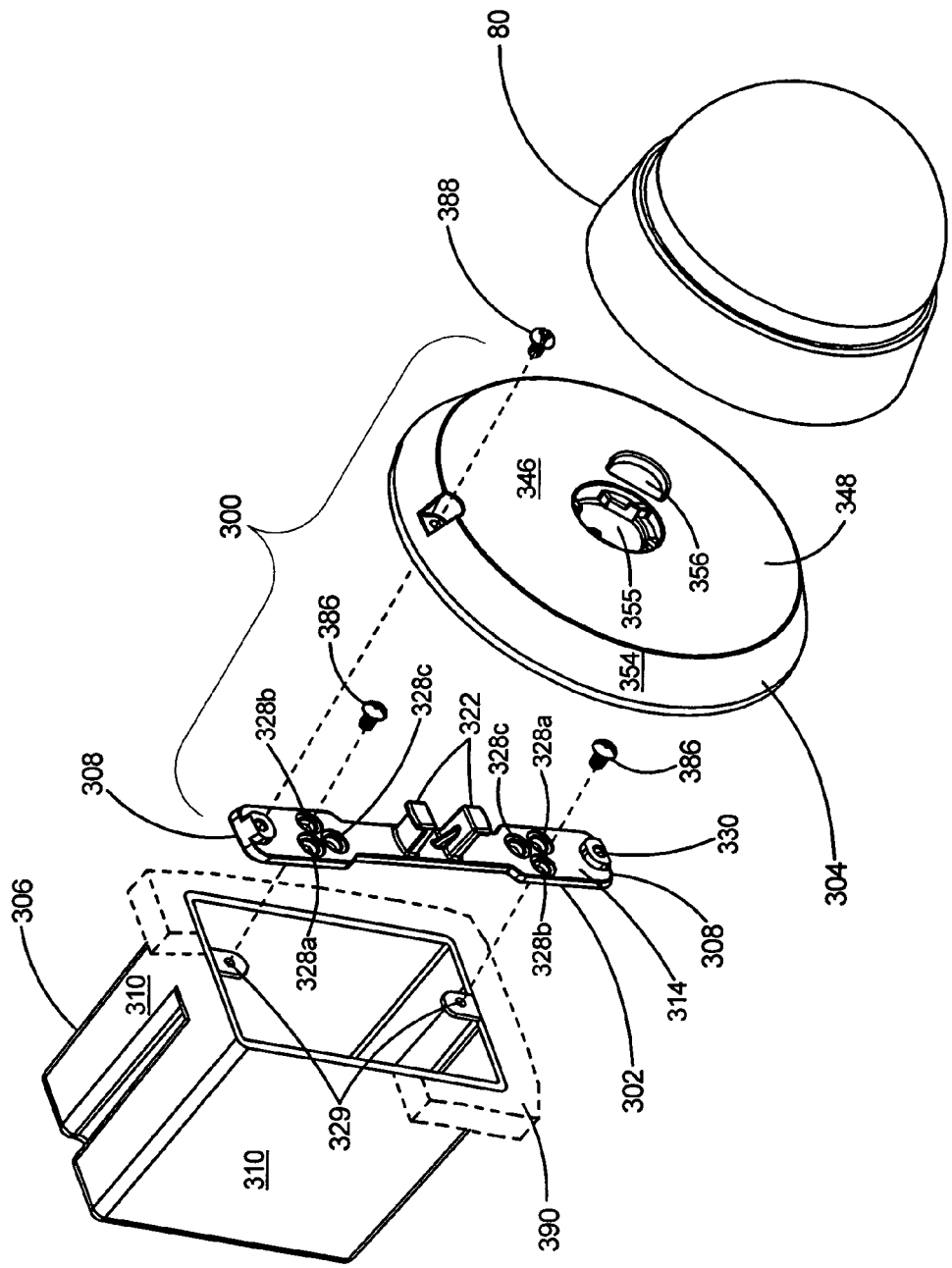
FIG. 28 is an exploded perspective view of a preferred embodiment of a camera mounting assembly according to the present invention in alignment with a conventional device box and a security camera.

Referring to FIG. 28, there is shown a third and preferred embodiment of a camera mounting assembly 300 for mounting a security camera 80 or an electrical fixture (not shown) on a wall, ceiling, or equivalent surface. The camera mounting assembly 300 includes a mounting bar 302 and an adapter plate 304. The camera mounting assembly 300 will be used to connect the security camera 80 to an electrical box 306. Preferably, the mounting bar 302 has a length that enables the ends 308 of the mounting bar 302 to extend substantially beyond the walls 310 of the electrical box 306. Preferably, the length of the mounting bar 302 is at least 4.5 inches. Most preferably, the length of the mounting bar 302 is at least 5.34 inches.

Figure 29:
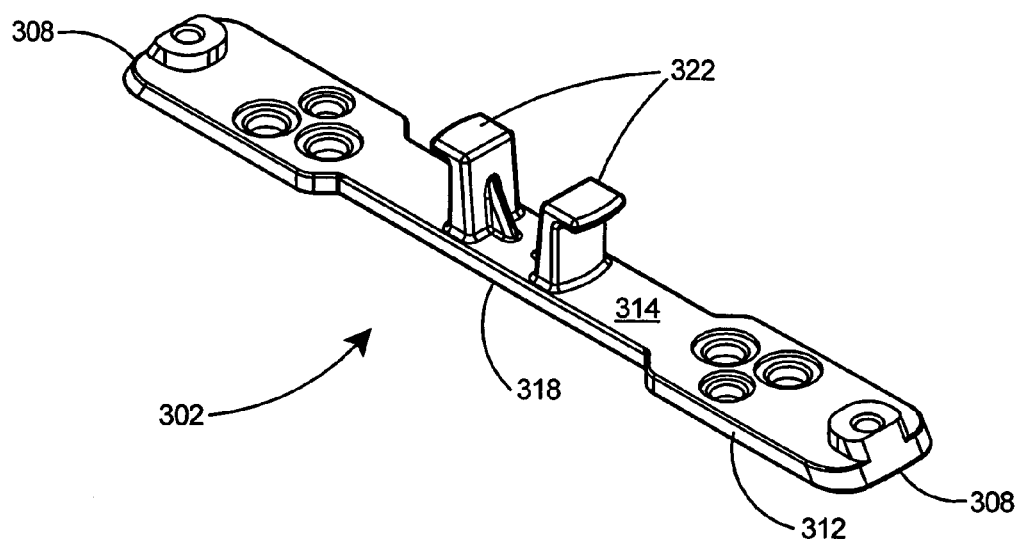
FIG. 29 is a front perspective view of a mounting bar that forms a portion of the camera mounting assembly of the present invention.
Figure 30:
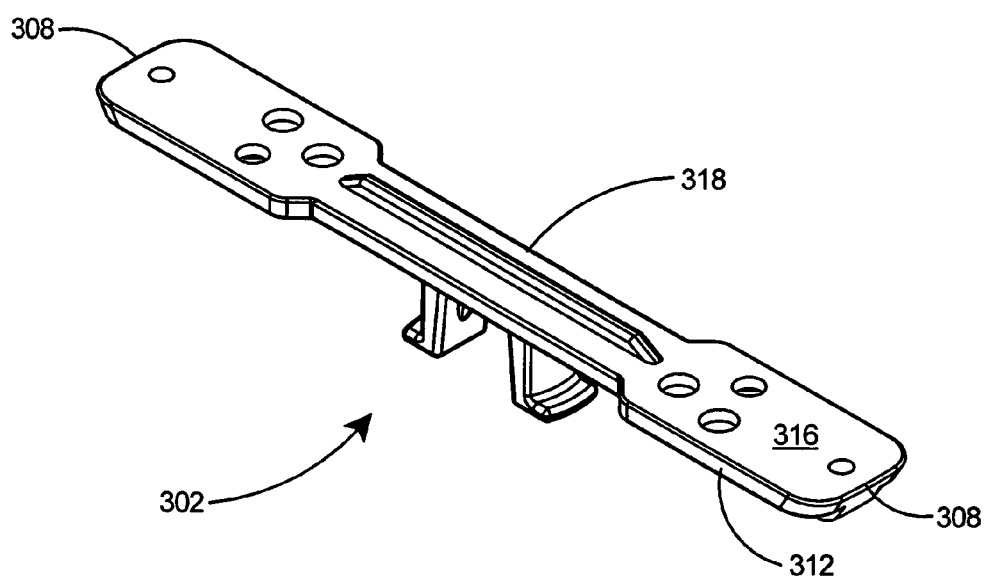
FIG. 30 is a rear perspective view of the mounting bar of FIG. 29.

With reference to FIGS. 29 and 30, the mounting bar 302 includes an elongated base member 312 having a front surface 314, a rear surface 316, and a center 318. The mounting bar 302 includes two prongs 322 extending from the front surface 314 of the base member 312.

Figure 31:
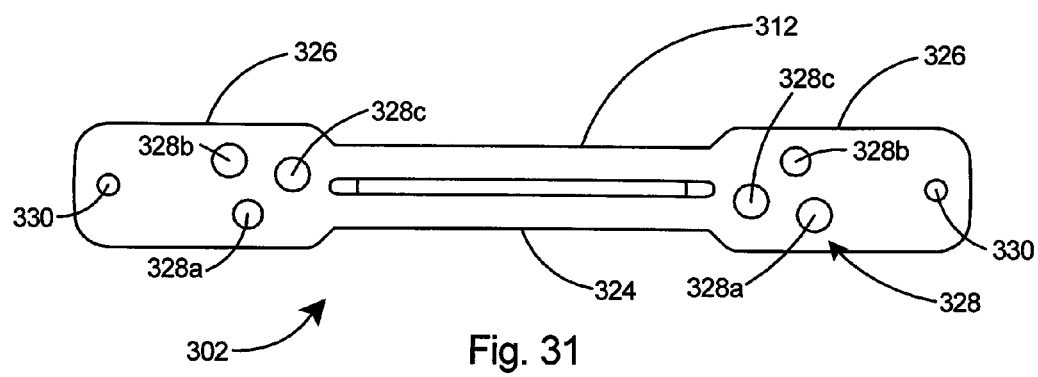
FIG. 31 is a front elevation view of the mounting bar of FIG. 29.

Referring to FIGS. 31-34, the base member 312 of the mounting bar 302 includes a narrow central portion 324, wide end portions 326, and one or more box mounting apertures 328 therein in each of the wide end portions 326. The mounting bar 302 can be aligned with any of several conventional electrical boxes, such as shown in FIG. 28, and the pair of box mounting apertures 328 aligned with the connection points 329 of the electrical box in order to secure the mounting bar to the electrical box. Thus, as shown in FIG. 31 three pairs of box mounting apertures are provided including mounting pairs 328a, 328b, and 328c. The base member 312 of the mounting bar 302 further includes at least one second aperture 330 at one end of the base member 312.

Figure 32:
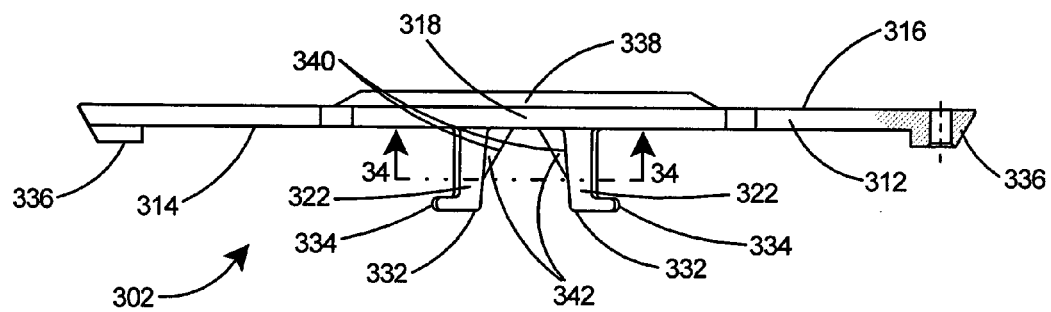
FIG. 32 is a side view of the mounting bar.
Figure 33:
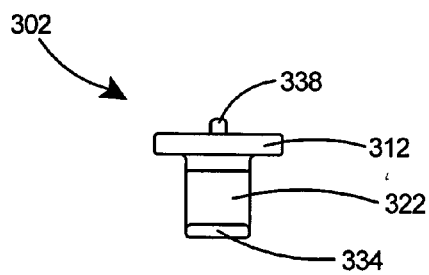
FIG. 33 is an end view of the mounting bar.
Figure 34:
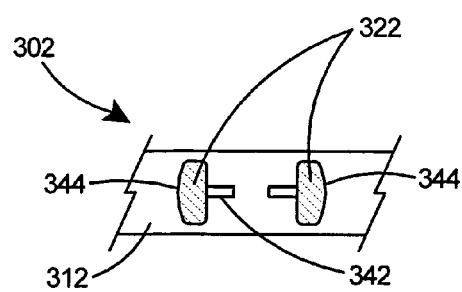
FIG. 34 is a sectional view of the mounting bar taken along line 34-34 of FIG. 32.

With reference to FIG. 32, the prongs 322 of the mounting bar 302 include distal ends 332 and a tab 334 orthogonal to and extending outward from the distal ends 332 of each of the prongs 322. The tabs 334 extend away from the center 318 of the base member 312. A boss 336 is provided surrounding each of the second apertures 330 and extending from the front surface 314 of the mounting bar 302. A longitudinal rib 338 extends from the front surface 314 of the base member 312 portion of the mounting bar 302. The prongs 322 of the mounting bar 302 include an inside surface 340 and the mounting bar 302 includes a strut 342 extending from the front surface 314 of the base member 312 to the inside surface 340 of each of the prongs 322. Preferably, as shown in FIG. 34, the shape of the prongs 322 across their outside surfaces 344 is arcuate.

Figure 35:
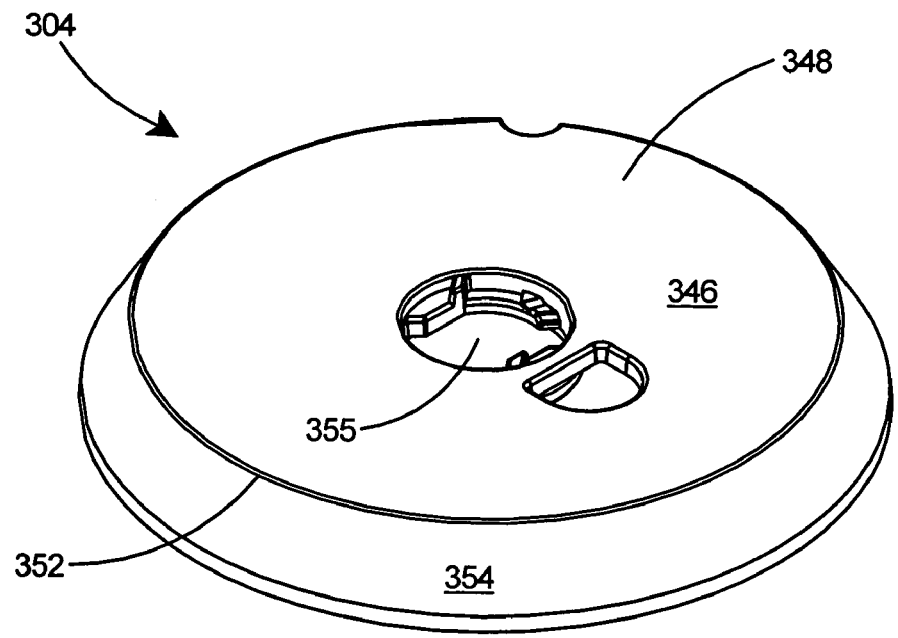
FIG. 35 is a front perspective view of an adapter plate that forms a portion of the camera mounting assembly of the present invention.
Figure 36:
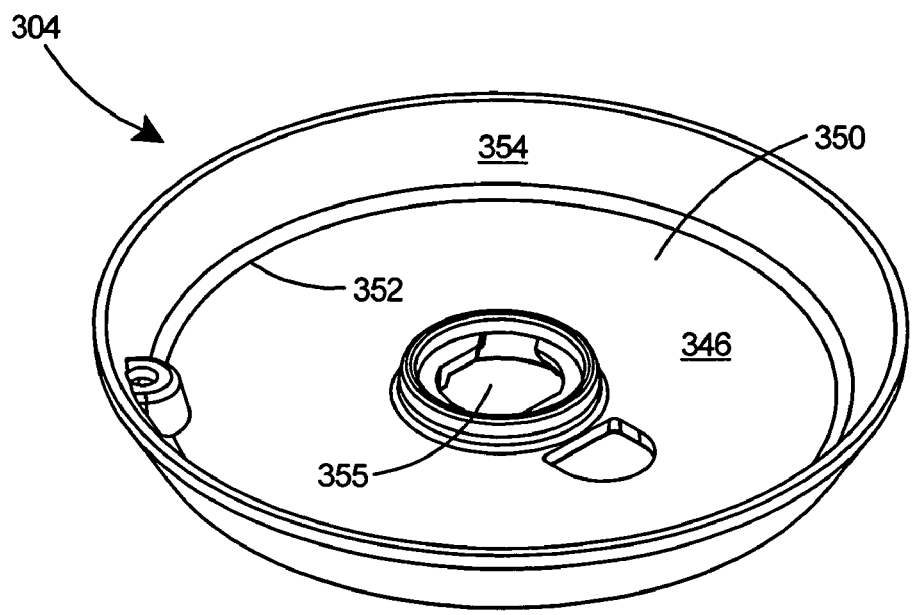
FIG. 36 is a rear perspective view of the adapter plate of FIG. 35.

With reference to FIGS. 35 and 36, in the preferred embodiment of the camera mounting assembly the adapter plate 304 includes a planar disk portion 346 with a front surface 348, a rear surface 350, and an outer periphery 352. A peripheral wall 354 extends rearward from the outer periphery 352 of the planar disk portion 346. The planar disk portion 346 of the adapter plate 304 includes a central opening 355 therein.

Figure 37:
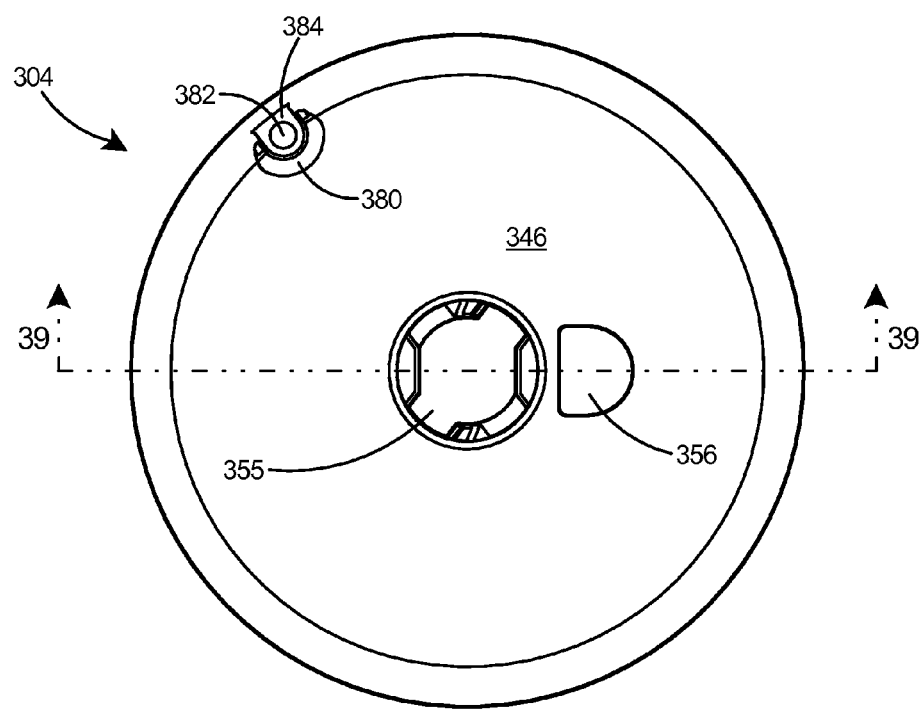
FIG. 37 is a plan view of the adapter plate of FIG. 35.
Figure 38:
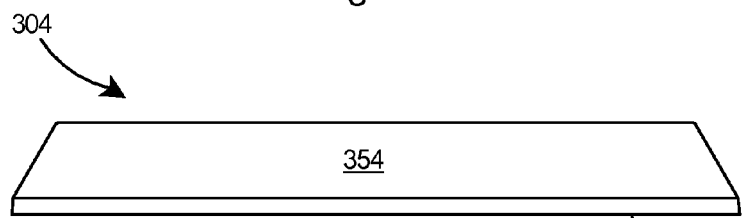
FIG. 38 is a side view of the adapter plate.
Figure 39:
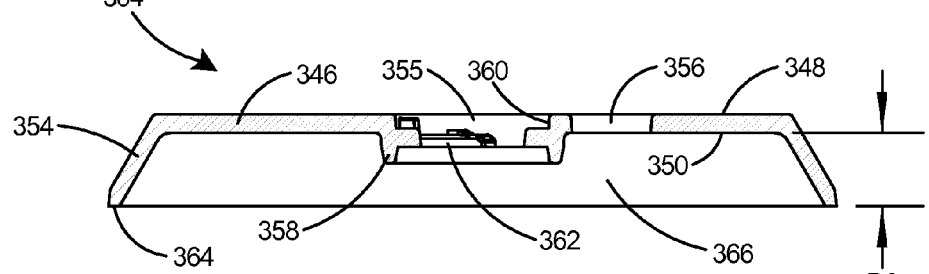
FIG. 39 is a sectional view of the adapter plate taken along line 39-39 of FIG. 37.

Referring to FIGS. 37-39, planar disk portion 346 of the adapter plate 304 includes second opening 356 therein adjacent the central opening 355. As shown in FIG. 39, the adapter plate 304 includes a circular flange 358 extending from the rear surface 350 of the disk portion 346 and surrounding the central opening 355. The circular flange 358 includes an inner surface 360 and a prong engagement member 362 extending from the inner surface 360. The peripheral wall 354 of the adapter plate 304 includes an end 364 and a recessed area 366 between the rear surface 350 of the disk portion 346 and the end of 364 the peripheral wall 354. Preferably, the depth D3 of the recessed area 366 is at least 0.25 inch. Most preferably, the depth D3 of the recessed area 366 is at least 0.56 inch.

Figure 40:
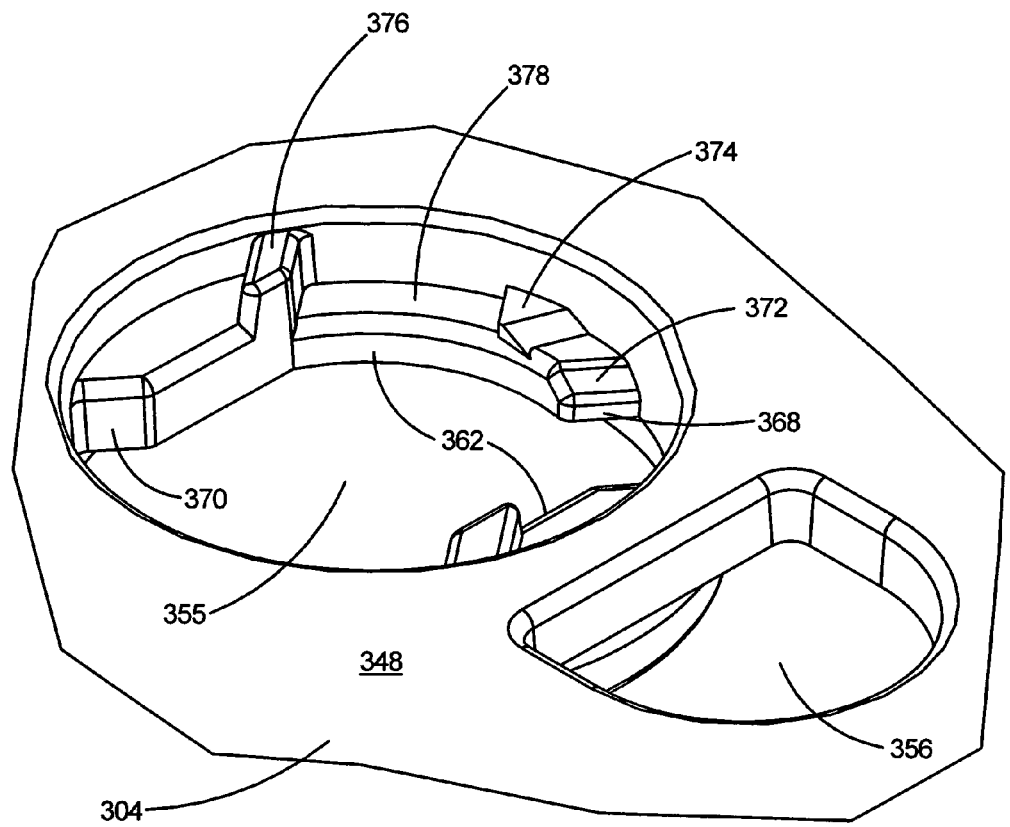
FIG. 40 is a perspective view of the center portion of the adapter plate of FIG. 35 including the central opening and the second opening.

With reference to FIG. 40, the adapter plate 304 includes two prong engagement members 362 each of which include a first end 368, a second end 370, and an inclined surface 372 at the first end 368. The prong engagement member 362 further includes a nub 374 adjacent the inclined surface 372, with the nub 374 extending orthogonally from the prong engagement member 362. A stop member 376 extends orthogonally from the prong engagement member 362 adjacent the second end 370 and a seat 378 extends between the nub 374 and the stop member 376.

Figure 41:
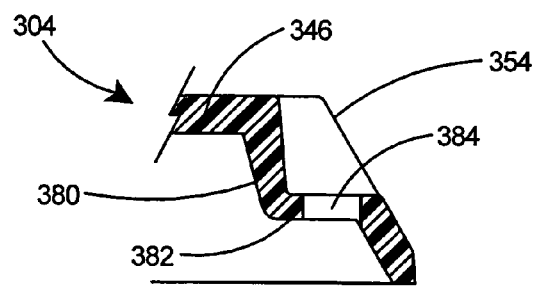
FIG. 41 is a sectional view of the adapter plate taken along line 41-41 of FIG. 37.

As shown in FIG. 41, the peripheral wall 354 of the adapter plate 304 includes a boss 380 formed therein. The boss 380 includes a shelf 382 parallel with the planar disk portion 346 and a bore 384 in the shelf 382.

With reference to FIG. 28, the preferred embodiment of the camera mounting assembly 300 includes the mounting bar 302 and the adapter plate 304 along with fasteners 386 for securing the mounting bar 302 to the electrical box 306 and a fastener 388 for securing the adapter plate 304 to the mounting bar 302. For the practice of the invention, the mounting bar 302, adapter plate 304, fasteners 386, and fastener 388 are typically provided as a package. The camera mounting assembly 300 can be used with a wide variety of conventional electrical boxes including 3-inch, 4-inch, or 2×3" device boxes.

For operation of the camera mounting assembly 300, reference is made to FIG. 28. Electrical box 306 is installed in the wall, ceiling, or similar location prior to operating the invention. Description herein will be in regards to a wall location. As shown in FIG. 28, with electrical box 306 secured in the wall 390, the installer selects the appropriate pair of box mounting apertures 328a, 328b, or 328c that match the spacing of connection points 329. As shown in FIG. 28, mounting bar 302 is positioned with front surface 314 and prongs 322 facing outward of the electrical box 306, box mounting apertures 328b are then aligned with connection points 329, and fasteners 386 are driven through mounting apertures 328b into connection points 329 in order to secure mounting bar 302 to electrical box 306. After the mounting bar 302 is secured to the electrical box 306, the prongs 322 of the mounting bar 302 extend outward from the electrical box 306.

Figure 42:
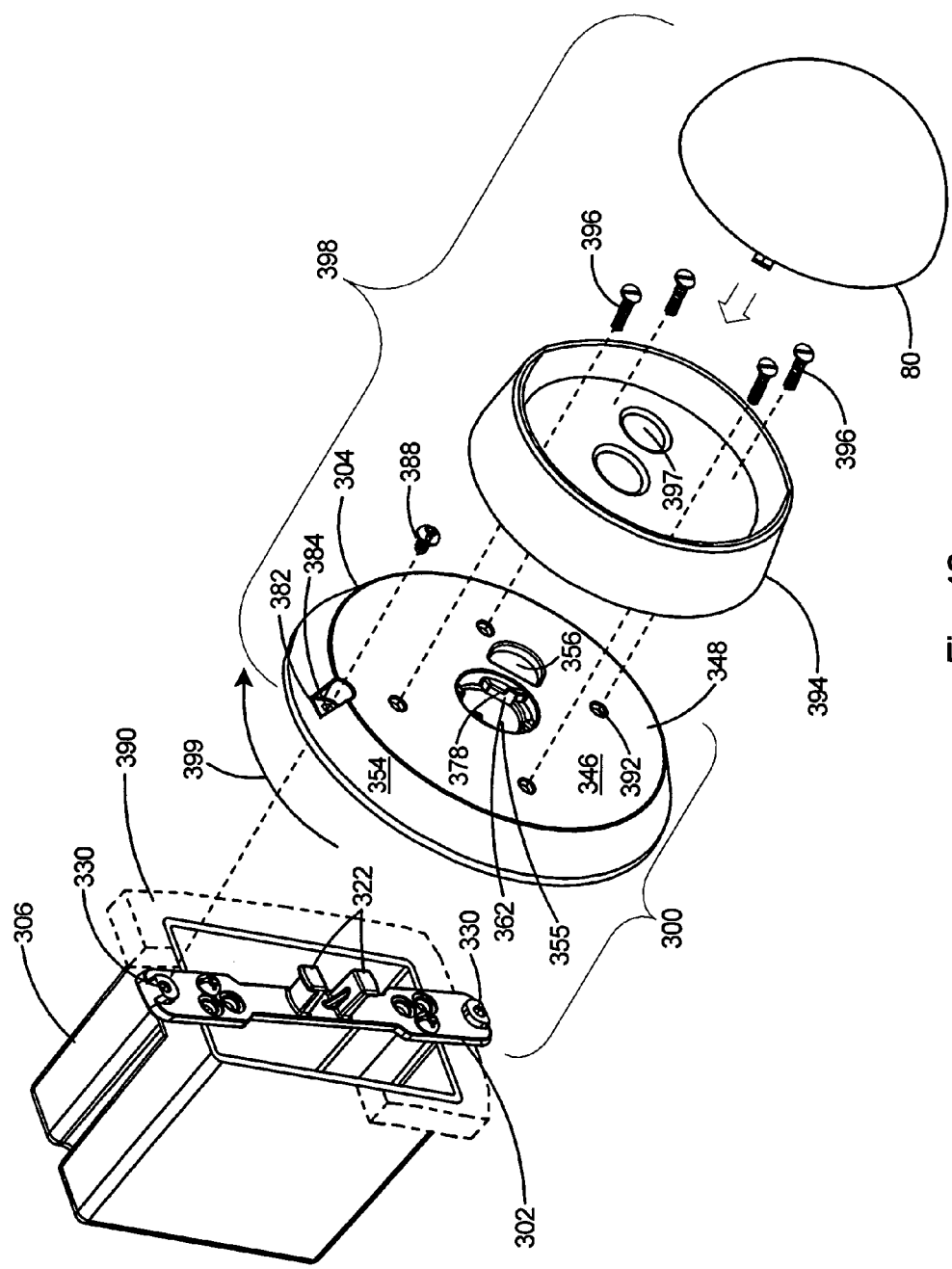
FIG. 42 is an exploded perspective view of the preferred embodiment of the camera mounting assembly with the mounting bar secured to the electrical box and the adapter plate and a security camera in alignment with the mounting bar and box.
Figure 43:
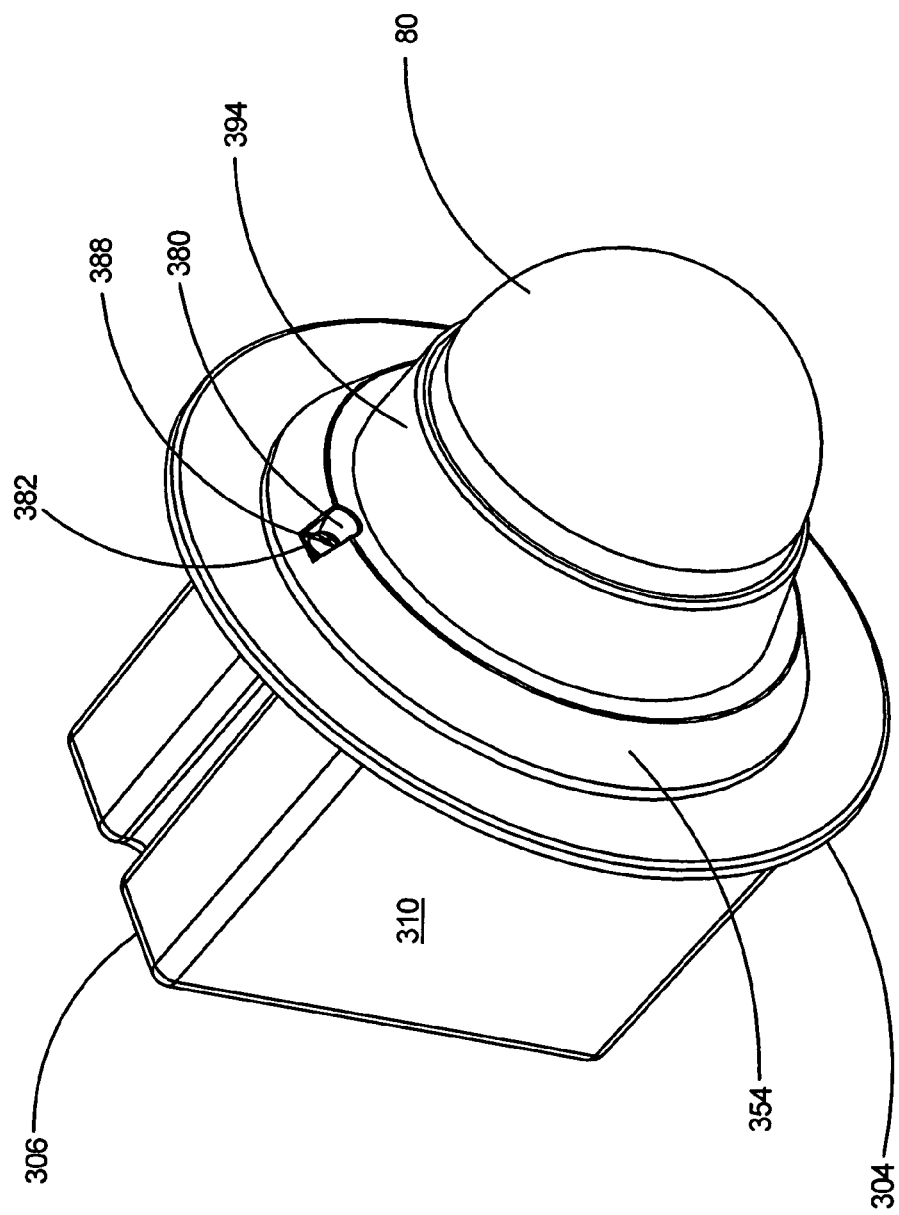
FIG. 43 is a perspective view of the camera mounting assembly of FIG. 28 after the camera has been secured to the electrical box with the assembly.

Referring to FIG. 42, with the mounting bar 302 secured to the electrical box 306, adapter plate 304 is positioned with front surface 348 of planar disk portion 346 facing away from the electrical box 306 and with central opening 355 of adapter plate 304 aligned with prongs 322 of mounting bar 302. Apertures 392 are drilled in disk 346 and camera housing 394 of security camera 80 is secured to the adapter plate 304 with threaded camera housing fasteners 396. With security camera 80 secured to adapter plate 304, electrical wiring (not shown) is routed from electrical box 306 through second opening 356 in adapter plate 304 for connection to the camera 80. Routing wiring to the camera 80 may require that an aperture 397 be drilled in the camera housing 394 in alignment with second opening 356 of adapter plate 304. After wiring connections are made within the camera housing 394, security camera 80 is secured to camera housing 394. Camera mounting assembly 300 is adaptable to the mounting of most commercially available security cameras. With wiring connected to the security camera 80 and the camera assembly secured to the adapter plate 304, the installer simply places the adapter plate and camera assembly 398 over the prongs 322 of mounting bar 302, with the prongs 322 extending through central opening 355, and rotates the adapter plate and camera assembly 398 clockwise one-quarter turn in the direction of arrow 399 to lock the adapter plate and camera assembly 398 to the mounting bar 302 and in turn to the electrical box 306. The adapter plate and camera assembly 398 are locked to the mounting bar 302 by rotating the adapter plate 304 until the prongs 322 are seated on the seat 378 of the prong engagement member 362. To ensure engagement of adapter plate 304 and plate and camera assembly 398 to the electrical box 306 and prevent counterclockwise rotation of plate and camera assembly 398 with respect to the mounting bar 302, fastener 388 is secured through the bore 384 in the shelf 382 of the adapter plate 304 into the second aperture 330 in the mounting bar 302. FIG. 43 depicts the completed installation, with security camera 80 securely mounted to electrical box 306.

Figure 44:
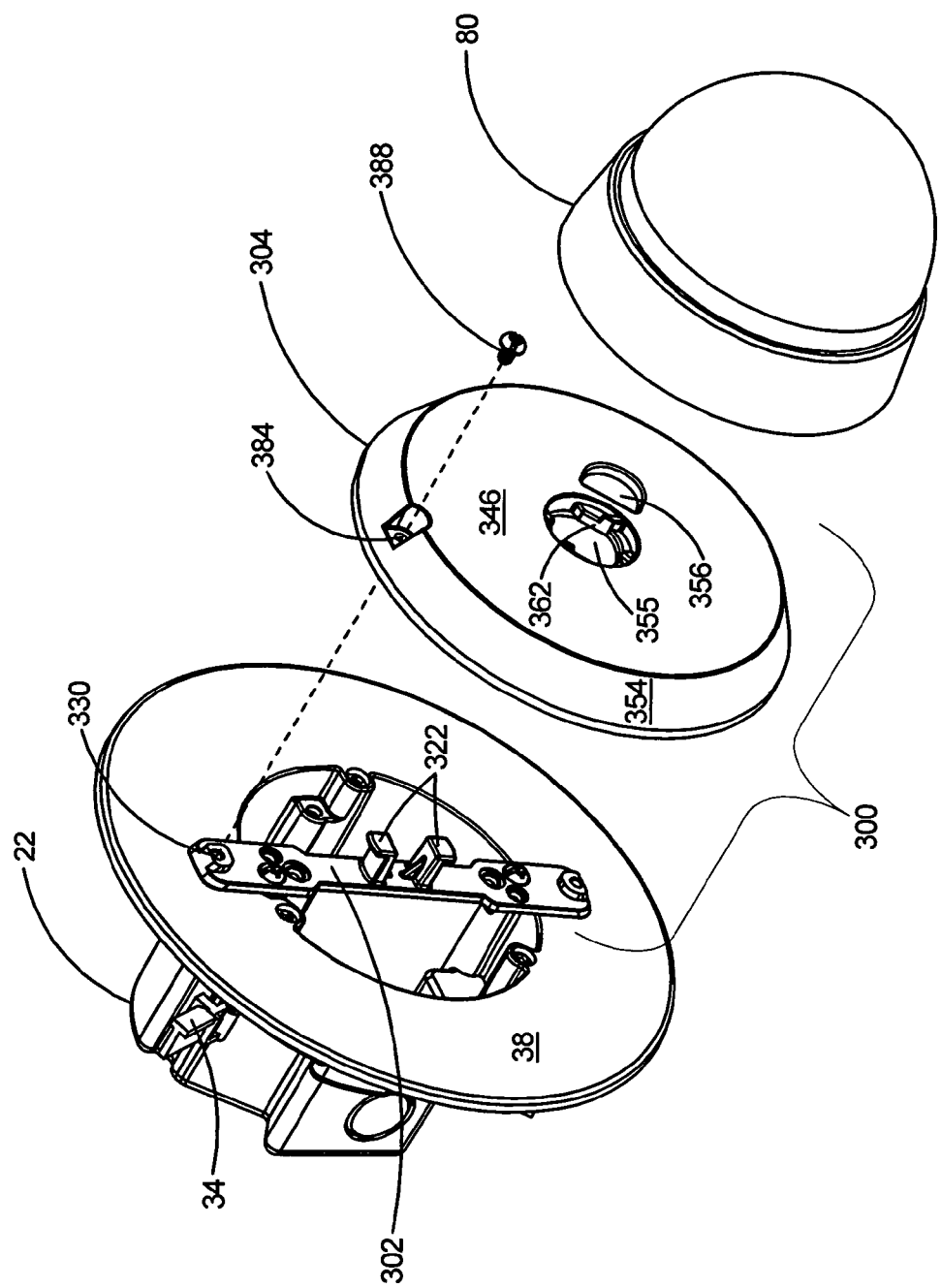
FIG. 44 is a an exploded perspective view of the preferred embodiment of the camera mounting assembly in alignment with the first embodiment of an electrical box assembly as shown in FIG. 1.

Referring to FIG. 44, in addition to use with a conventional electrical box, the preferred embodiment of the camera mounting assembly 300, including the mounting bar 302 and adapter plate 304, can also be used to mount a security camera 80 to the electrical box 22 with rotatable flags 34 and flange 38 such as described herein with regards to the first and second embodiments of an electrical box assembly.

As shown in FIG. 42, the peripheral wall 354 of the preferred embodiment of the camera mounting assembly 300, including the mounting bar 302 and the adapter plate 304, provides a significant advantage to the installer in that the wide recessed area 366 (see FIG. 39) provides substantial space to accommodate camera housing fasteners 396. Typically, the camera housing fasteners 396 extend through the planar disk 346 portion of the adapter plate 304. Thus, when the adapter plate and camera assembly 398 is rotated onto the prongs 322 of the mounting bar 302, the recessed area provided by peripheral wall 354 of adapter plate 304 provides ample clearance to enable the adapter plate and camera assembly 398 to rotate against the mounting bar 302 without obstruction from the camera housing fasteners 396. As shown in FIGS. 5 and 16, adapter plate of the first and second embodiments lacked a peripheral wall and was substantially flat in profile.

In the preferred embodiment of the camera mounting assembly 300, the mounting bar 302 and adapter plate 304 are each preferably molded in one piece of plastic. Preferably, the plastic is polycarbonate, polyvinyl chloride, acrylonitrile-butadiene styrene, or polyethylene. However, the mounting bar 302 and adapter plate 304 can each also be constructed of metal.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A camera mounting assembly comprising:
    a mounting bar including an elongated base member having a front surface, a rear surface, a center, and two ends;
    two prongs extending from said front surface of said base member, said prongs including distal ends;
    a tab orthogonal to and extending outward from said ends of each of said prongs, said tabs extending away from said center of said base member;
    one or more box mounting apertures in said base member;
    a second aperture in said base member at one of said ends of said base member;
    fasteners for securing through said mounting apertures in said base member;
    an adapter plate including a planar disk portion with a front surface and a central opening, a rear surface, an outer periphery, and a flange extending from said rear surface of said disk portion and surrounding said central opening, said flange including an inner surface;
    a prong engagement member extending from said inner surface of said flange for engaging said prongs of said mounting bar; and
    a peripheral wall extending rearward from said outer periphery of said disk portion of said adapter plate.

2. The camera mounting assembly of claim 1 wherein said prong engagement member includes
    a first end and a second end; and
    an inclined surface at said first end.

3. The camera mounting assembly of claim 2 wherein said prong engagement member includes
    a nub adjacent said inclined surface, said nub extending orthogonally from said prong engagement member;
    a stop member extending orthogonally from said prong engagement member adjacent said second end; and
    a seat extending between said nub and said stop member.

4. The camera mounting assembly of claim 3 wherein said camera mounting assembly includes a security camera for engagement with said adapter plate and said mounting bar.

5. The camera mounting assembly of claim 4 wherein
    said mounting bar is secured to an electrical box by securing said fasteners through said mounting apertures of said base member and into said electrical box, said prongs of said mounting bar thereby extending outward from said electrical box;
    said security camera is secured to said adapter plate by threaded fasteners;
    said adapter plate with said security camera attached is secured to said mounting bar by aligning said rear surface of said adapter plate toward said mounting bar, placing said central opening of said adapter plate over said prongs of said mounting bar; and
    rotating said adapter plate until said prongs are seated on said seat of said prong engagement member.

6. The camera mounting assembly of claim 1 wherein said planar disk portion of said adapter plate includes a second opening therein adjacent said central opening.

7. The camera mounting assembly of claim 1 including a boss surrounding said second aperture of said mounting bar.

8. The camera mounting assembly of claim 1 wherein said base member of said mounting bar includes a narrow central portion and wide end portions.

9. The camera mounting assembly of claim 1 wherein said mounting bar is of a length to extend substantially beyond the walls of an electrical box that it is used in conjunction with.

10. The camera mounting assembly of claim 9 wherein said length of said mounting bar is at least 4.5 inches.

11. The camera mounting assembly of claim 1 including a longitudinal rib extending from said front surface of said mounting bar.

12. A camera mounting assembly comprising
    a mounting bar including an elongated base member having a front surface, a rear surface, a center, and two ends;
    two prongs extending from said front surface of said base member, said prongs including distal ends;
    a tab orthogonal to and extending outward from said ends of each of said prongs, said tabs extending away from said center of said base member;
    one or more box mounting apertures in said base member;
    a second aperture in said base member at one of said ends of said base member;
    fasteners for securing through said mounting apertures in said base member;
    an adapter plate including a planar disk portion with a front surface, a rear surface, and an outer periphery; and
    a peripheral wall extending rearward from said outer periphery of said disk portion of said adapter plate;
    said prongs of said mounting bar include an inside surface; and
    said mounting bar includes a strut extending from said front surface of said mounting bar to said inside surface of each of said prongs.

13. A camera mounting assembly comprising
    a mounting bar including an elongated base member having a front surface, a rear surface, a center, and two ends;
    two prongs extending from said front surface of said base member, said prongs including distal ends;
    a tab orthogonal to and extending outward from said ends of each of said prongs, said tabs extending away from said center of said base member;
    one or more box mounting apertures in said base member;
    a second aperture in said base member at one of said ends of said base member;
    fasteners for securing through said mounting apertures in said base member;
    an adapter plate including a planar disk portion with a front surface, a rear surface, and an outer periphery; and
    a peripheral wall extending rearward from said outer periphery of said disk portion of said adapter plate;
    said peripheral wall of said adapter plate includes an end; and
    a recessed area between said rear surface of said disk portion and said end of said peripheral wall.

14. The camera mounting assembly of claim 13 wherein the depth of said recessed area is at least 0.25 inch.

* * * * *